US007746310B2

(12) United States Patent
Ahn

(10) Patent No.: US 7,746,310 B2
(45) Date of Patent: *Jun. 29, 2010

(54) APPARATUS AND METHOD FOR DATA-DRIVING LIQUID CRYSTAL DISPLAY

(75) Inventor: Seung Kuk Ahn, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1248 days.

This patent is subject to a terminal disclaimer.

(21) Appl. No.: 11/287,191

(22) Filed: Nov. 28, 2005

(65) Prior Publication Data

US 2006/0077164 A1 Apr. 13, 2006

Related U.S. Application Data

(63) Continuation of application No. 10/287,680, filed on Nov. 5, 2002, now Pat. No. 7,006,072.

(30) Foreign Application Priority Data

Nov. 10, 2001 (KR) ........................... P2001-069945
Jul. 16, 2002 (KR) ........................... P2002-041769

(51) Int. Cl.
*G09G 3/36* (2006.01)
*G09G 5/00* (2006.01)
*G06F 3/038* (2006.01)

(52) U.S. Cl. ........................... 345/98; 345/99; 345/100; 345/204

(58) Field of Classification Search ................. 345/204, 345/61, 87–89, 98–100, 103
See application file for complete search history.

(56) References Cited

U.S. PATENT DOCUMENTS 6,008,801 A 12/1999 Jeong
6,049,321 A 4/2000 Sasaki
6,097,362 A * 8/2000 Kim ............................ 345/87
6,268,841 B1 7/2001 Cairns et al.
6,335,721 B1 * 1/2002 Jeong ......................... 345/100
6,538,631 B1 3/2003 Kwon
6,963,328 B2 * 11/2005 Kang et al. ................. 345/100
7,006,072 B2 * 2/2006 Ahn ........................... 345/103
7,030,844 B2 * 4/2006 Kang et al. ................... 345/87
7,038,652 B2 * 5/2006 Kang et al. ................... 345/98

(Continued)

FOREIGN PATENT DOCUMENTS

CN 1 281 155 A 1/2001

(Continued)

*Primary Examiner*—Alexander S. Beck
(74) *Attorney, Agent, or Firm*—McKenna Long & Aldridge LLP

(57) ABSTRACT

The present invention discloses an apparatus and method for data-driving a liquid crystal display wherein data lines are time-divided to reduce the number of data driver integrated circuits and to improve the display quality of a picture at the same time. More specifically, the apparatus includes a first multiplexor array applying an input pixel data on a time-division basis, a digital-to-analog converter array converting the time-divided pixel data into pixel voltage signals, and a demultiplexor array performing the pixel voltage signals to the time-divided data lines.

3 Claims, 23 Drawing Sheets

U.S. PATENT DOCUMENTS

| | | | | |
|---|---|---|---|---|
| 7,180,497 | B2 * | 2/2007 | Lee et al. | 345/98 |
| 7,205,972 | B1 * | 4/2007 | Kyeong et al. | 345/98 |
| 2001/0003448 | A1 | 6/2001 | Nose et al. | |
| 2001/0054989 | A1 | 12/2001 | Zavracky et al. | |
| 2004/0104872 | A1 | 6/2004 | Kang et al. | |
| 2004/0104873 | A1 | 6/2004 | Kang et al. | |
| 2004/0104880 | A1 | 6/2004 | Kang et al. | |
| 2008/0170027 | A1 * | 7/2008 | Kyeong et al. | 345/100 |

FOREIGN PATENT DOCUMENTS

| | | |
|---|---|---|
| GB | 2 322 958 A | 9/1998 |
| GB | 2 325 329 A | 11/1998 |
| JP | 04-052684 | 2/1992 |
| JP | 05-173506 | 7/1993 |
| JP | 09-026765 | 1/1997 |
| JP | 09-281930 | 10/1997 |
| JP | 10-143116 | 5/1998 |
| JP | 10-260661 | 9/1998 |
| JP | 10-319924 | 12/1998 |
| JP | 11-175042 | 7/1999 |
| JP | 11-259036 | 9/1999 |
| JP | 2000-122627 | 4/2000 |
| JP | 2001-109435 | 4/2001 |
| KR | 1999-0031752 | 5/1999 |

* cited by examiner

APPARATUS AND METHOD FOR DATA-DRIVING LIQUID CRYSTAL DISPLAY

This application is a continuation of prior application Ser. No. 10/287,680, filed Nov. 5, 2002 now U.S. Pat. No. 7,006,072.

This application claims the benefit of the Korean Application Nos. P2001-069945 filed on Nov. 10, 2001, and P2002-041769 filed on Jul. 16, 2002, which are hereby incorporated by reference.

BACKGROUND OF THE INVENTION

1. Field of the Invention

The present invention relates to a liquid crystal display, and more particularly, to an apparatus and method for data-driving a liquid crystal display. Although the present invention is suitable for a wide scope of applications, it is particularly suitable for reducing the number of data driver integrated circuits for driving data lines on a time-division basis.

2. Discussion of the Related Art

Generally, a liquid crystal display (LCD) controls light transmittance of a liquid crystal using an electric field to display a picture. To this end, the LCD includes a liquid crystal display panel having liquid crystal cells arranged in an active matrix type, and a driving circuit for driving the liquid crystal display panel.

An LCD according to the related art, as shown in FIG. 1, includes data-driving IC's 4 connected through data tape carrier packages (TCP's) 6 to a liquid crystal display panel 2, and gate driving IC's 8 connected through gate TCP's 10 to the liquid crystal display panel 2.

More specifically, the liquid crystal display panel 2 includes a thin film transistor TFT formed at an intersection of a gate line and a data line, and a liquid crystal cell connected to the TFT. A gate electrode of the TFT is connected to one of the gate lines being vertical lines, and a source electrode is connected to one of the data lines being horizontal lines. Such a TFT responds to a scanning signal from the gate line to supply a pixel voltage signal from the data line to the liquid crystal cell. The liquid crystal cell includes a pixel electrode connected to a drain electrode of the TFT and a common electrode facing into the pixel electrode with a liquid crystal therebetween. Such a liquid crystal cell responds to the pixel voltage signal supplied to the pixel electrode to drive the liquid crystal, thereby controlling its light transmittance.

Each of the gate driving IC's 8 is mounted on the gate TCP 10. The gate driving IC's 8 mounted on the gate TCP 10 are electrically connected to the corresponding gate pads of the liquid crystal display panel 2 through the gate TCP 10. The gate driving IC's 8 sequentially drive the gate lines of the liquid crystal display panel 2 for each horizontal period 1H.

Each of the data-driving IC's 4 is mounted on the data TCP 6. The data-driving IC's 4 mounted on the data TCP 6 are electrically connected to the corresponding data pads of the liquid crystal display panel 2 through the data TCP 6. The data-driving IC's 4 convert digital pixel data into an analog pixel voltage signal and supply to the data lines of the liquid crystal display panel 2 for each horizontal period 1H.

To this end, as shown in FIG. 2, each of the data-driving IC's 4 includes a shift register 12 for applying a sequential sampling signal, first and second latch arrays 16 and 18 for latching and outputting a pixel data VD in response to the sampling signal, a first multiplexor MUX array 15 arranged between the first and second latch arrays 16 and 18, a digital-to-analog converter (DAC) array 20 for converting the pixel data from the second latch array 18 into a pixel voltage signal, a buffer array 26 for buffering and outputting the pixel voltage signal from the DAC array 20, and a second multiplexor array 30 for selecting a path of an output of the buffer array 26. Further, the data-driving IC 4 includes a data register 34 for interfacing pixel data (R, G, and B) from a timing controller (not shown), and a gamma voltage part 36 for supplying positive and negative gamma voltages required in the DAC array 20.

Each data-driving IC 4 having the configuration as mentioned above has n channel (e.g., 384 or 480 channel) data outputs to drive n data lines. FIG. 2 illustrates only 6 channels DL1 to DL6 of the n channels of the data-driving IC 4.

The data register 34 interfaces the pixel data from the timing controller and applies the pixel data to the first latch array 16. Particularly, the timing controller divides the pixel data into even pixel data RGBeven and odd pixel data RGBodd for the purpose of reducing a transmission frequency and supplies the divided pixel data through each transmission line to the data register 34. The data register 34 outputs the input even and odd pixel data RGBeven and RGBodd to the first latch array 16 over each transmission line. Herein, each of the even pixel data RGBeven and the odd pixel data RGBodd includes red(R), green(G), and blue(B) pixel data.

The gamma voltage part 36 further divides a plurality of gamma reference voltages from a gamma reference voltage generator (not shown) for each gray level and output the divided voltages.

The shift register array 12 generates a plurality of sequential sampling signals and applies the sampling signals to the first latch array 16. To this end, the shift register array 12 is comprised of n/6 shift registers 14. The shift register 14 at the first stage in FIG. 2 shifts a source start pulse SSP from the timing controller in response to a source sampling clock signal SSC to output the shifted source start pulse as a sampling signal. At the same time, the shift register 14 applies the sampling signal to the shift register 14 at the next stage as a carry signal CAR. The source start pulse SSP is applied for each horizontal period 1H, as shown in FIGS. 3A and 3B, and is shifted every source sampling clock signal SSC to be outputted as a sampling signal.

The first latch array 16 samples and latches the pixel data RGBeven and RGBodd from the data register 34 by a certain unit in response to the sampling signal from the shift register array 12. The first latch array 16 consists of n first latches 13 for latching n pixel data R, G, and B, each of which has a size corresponding to the bit number (i.e., 3 bits or 6 bits) of the pixel data R, G, and B. Such a first latch array 16 samples and latches the even pixel data RGBeven and the odd pixel data RGBodd (i.e., each 6 pixel data) for each sampling signal, and then outputs the latched data simultaneously.

The first multiplexor array 15 determines a path of the pixel data R, G, and B supplied from the first latch array 16 in response to a polarity control signal POL from the timing controller. To this end, the first multiplexor array 15 includes (n−1) first multiplexors 17. Each of the first multiplexors 17 receives output signals of the two adjacent first latches 13 to selectively output the signals in response to the polarity control signal POL. Herein, the outputs of the remaining first latches 13 excluding the first and last first latches 13 are commonly inputted to the two adjacent first multiplexors 17. The outputs of the first and last first latches 13 are commonly inputted to the second latch array 18 and the first multiplexor 17. The first multiplexor array 15 having the configuration as mentioned above allows the pixel data R, G, and B from each first latch 13 to be advanced into the second latch array 18 as they are, or to be progressed into the second latch array 18 with being shifted toward the right side by one position in response to the polarity control signal POL. The polarity control signal POL has a polarity inverted for each horizontal period 1H, as shown in FIGS. 3A and 3B. As a result, the first multiplexor array 15 allows each pixel data R, G, and B from the first latch array 16 to be outputted through the second latch array 18 to a positive (P) DAC 22 or a negative (N) DAC 24 of the DAC array 20 in response to the polarity control signal POL, thereby controlling the polarities of the pixel data R, G, and B.

The second latch array 18 simultaneously latches the inputted pixel data R, G, and B through the first multiplexor array 15, from the first latch array 16 in response to a source output enable signal SOE from the timing controller, and then output the latched pixel data. Particularly, the second latch array 18 includes (n+1) second latches 19 in consideration of the pixel data R, G, and B from the first latch array 16 inputted with being shifted to the right. The source output enable signal SOE is generated for each horizontal period 1H, as shown in FIGS. 3A and 3B. The second latch array 18 simultaneously latches the pixel data R, G, and B inputted at the rising edge of the source output enable signal SOE, and simultaneously outputs the latched pixel data at the falling edge thereof.

The DAC array 20 converts the pixel data R, G, and B from the second latch array 18 into pixel voltage signals with the aid of positive and negative gamma voltages GH and GL from the gamma voltage part 36 to output the pixel voltage signals. To this end, the DAC array 20 includes (n+1) PDAC's 22 and (n+1) NDAC's 24, which are alternately arranged in parallel to each other. The PDAC 22 converts the pixel data R, G, and B from the second latch array 18 into positive pixel voltage signals using the positive gamma voltages GH. On the other hand, the NDAC 24 converts the pixel data R, G, and B from the second latch array 18 into negative pixel voltage signals using the negative gamma voltages GL. Each of (n+1) buffers 28 is included in the buffer array 26 buffers and outputs a pixel voltage signal from each of the PDAC's 22 and the NDAC's 24 of the DAC array 20.

The second multiplexor array 30 determines a path of each pixel voltage signal from the buffer array 26 in response to the polarity control signal POL from the timing controller. To this end, the second multiplexor array 30 includes n second multiplexors 32. Each of the second multiplexors 32 selects any one output of the two adjacent buffers 28 in response to the polarity control signal POL and outputs the selected signal to the corresponding data line DL. Herein, the outputs of the remaining buffers 28 excluding the first and last buffers 28 are commonly inputted to the two adjacent second multiplexors. The second multiplexor array 30 having the configuration as mentioned above allows the pixel voltage signals from the buffers 28 excluding the last buffer 28 to be outputted to the data lines DL1 to DL6 as they are at a corresponding one to one relationship in response to the polarity control signal POL. Further, the second multiplexor array 30 allows the pixel voltage signals from the remaining buffers 28 excluding the first buffer 28 to be outputted to the data lines DL1 to DL6 with being shifted toward the left side by one position at a corresponding one to one relationship in response to the polarity control signal POL. The polarity control signal POL has a polarity inverted for each horizontal period 1H, as shown in FIGS. 3A and 3B, similar to the first multiplexor array 15. As mentioned above, the second multiplexor array 30, along with the first multiplexor array 15, determines polarities of the pixel voltage signals applied to the data lines DL1 to DL6 in response to the polarity control signal POL. As a result, the pixel voltage signal applied through the second multiplexor array 30 to each data line DL1 to DL6 has a polarity opposite to the adjacent pixel voltage signals. In other words, as shown in FIGS. 3A and 3B, the pixel voltage signals outputted to the odd data lines DLodd, such as DL1, DL3 and DL5, etc., have polarities opposite to the pixel voltage signals outputted to the even data lines DLeven, such as DL2, DL4 and DL6, etc. Polarities of the odd data lines DLodd and the even data lines DLeven are inverted for each horizontal period 1H at which the gate lines GL1, GL2, GL3, . . . are sequentially driven, and are inverted for each frame.

As described above, each of the related art data-driving IC's 4 requires (n+1) DAC's and (n+1) buffers so as to drive n data lines. As a result, the related art data-driving IC's 4 have disadvantages in that the configuration are complex and the manufacturing costs are relatively high.

SUMMARY OF THE INVENTION

Accordingly, the present invention is directed to an apparatus and method for data-driving a liquid crystal display that substantially obviates one or more of problems due to limitations and disadvantages of the related art.

Another object of the present invention is to provide an apparatus and method for data-driving a liquid crystal display wherein data lines can be driven on a time-division basis to reduce the number of data-driving IC's and to improve the display quality of a picture at the same time.

A further object of the present invention is to provide an apparatus and method for data-driving a liquid crystal display that is adaptive for compensating for a pixel voltage charging amount difference caused by a pixel voltage charging time difference when data lines are driven on a time-division basis.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data-driving apparatus for a liquid crystal display includes a first multiplexor array applying input pixel data on a time-division basis, a digital-to-analog converter array converting the time-divided pixel data into pixel voltage signals, and a demultiplexor array performing time-division on data lines and supplying the pixel voltage signals to the time-divided data lines.

The data-driving apparatus further includes a shift register array sequentially generating a sampling signal, a latch array sequentially latching the pixel data in response to the sampling signal to simultaneously output the latched pixel data to the multiplexor array, and a buffer array buffering the pixel voltage signals and supplying to the demultiplexor array.

Herein, the first multiplexor array includes at least n first multiplexors and performs time-division on the input pixel data, so that the input pixel data include at least n time-divided pixel data (wherein n is an integer). The digital-to-analog converter array converts the n time-divided pixel data into pixel voltage signals. The demultiplexor array includes at least n demultiplexors and performs time-division on a plurality of data lines, so that the data lines include at least n time-divided data lines to supply the pixel voltage signal.

Herein, the digital-to-analog converter array includes at least (n+1) positive and negative digital-to-analog converters converting the at least n time-divided pixel data into the pixel voltage signals, wherein the positive digital-to-analog converter and the negative digital-to-analog converter are alternately arranged.

The data-driving apparatus further includes a second multiplexor array determining a path of the at least n time-divided pixel data in response to a polarity control signal to input the pixel data to the at least n positive and negative digital-to-analog converters among the at least (n+1) positive and negative digital-to-analog converters, and a third multiplexor array determining a path of the at least n pixel voltage signals in response to the polarity control signal to input the pixel voltage signals to the demultiplexor array.

In the data-driving apparatus, the second multiplexor array includes at least (n−1) second multiplexors selecting any one of outputs of at least two first multiplexors. The third multiplexor array includes at least n third multiplexors selecting any one of outputs of at least two digital-to-analog converters, wherein each output of the first multiplexors is shared as each input of at least the two second multiplexors, and each output of the digital-to-analog converters is shared as each input of at least the two third multiplexors.

Herein, an odd-numbered multiplexor among at least the n first multiplexors performs time-division on odd-numbered pixel data and outputs the time-divided odd-numbered pixel data in response to a first selection control signal, and an even-numbered multiplexor performs time-division on even-numbered pixel data and outputs the time-divided even-numbered pixel data in response to a second selection control signal.

Herein, an odd-numbered demultiplexor among at least the n demultiplexors performs time-division on odd-numbered data lines and drives the time-divided odd-numbered pixel data in response to the first selection control signal, and an even-numbered demultiplexor performs time-division on even-numbered data lines and drives the time-divided even-numbered data lines in response to the second selection control signal.

Herein, the first and second selection control signals have logical states opposite to each other, each logical state is being inverted for each ½ horizontal period.

In the data-driving apparatus, the polarity control signal has a logical state inverted for each horizontal period.

In the data-driving apparatus, the first multiplexor array and the demultiplexor array alternately change a supplying sequence of the time-divided pixel data and the pixel voltage signal in response to the first selection control signal and the second selection control signal.

In the data-driving apparatus, the first multiplexor array and the demultiplexor array change the supplying sequence of the time-divided pixel data and the pixel voltage signal by one or more frame unit in response to the first selection control signal and the second selection control signal.

Herein, the first multiplexor array and the demultiplexor array change the supplying sequence of the time-divided pixel data and the pixel voltage signal by one or more line unit in response to the first selection control signal and the second selection control signal.

Herein, the first multiplexor array and the demultiplexor array change the supplying sequence of the time-divided pixel data and the pixel voltage signal by one or more line unit and frame unit in response to the first selection control signal and the second selection control signal.

The data-driving apparatus further includes a data register rearranging the pixel data and outputting to the first multiplexor array, and a second multiplexor array determining a path of at least n pixel voltage signals outputted from the digital-to-analog converter array in response to the polarity control signal and sending to the demultiplexor array.

Herein, the data register exchanges $(4k-3)^{th}$ pixel data (k is a positive integer) with $(4k-2)^{th}$ pixel data among the pixel data and rearrange the exchanged pixel data.

Herein, the data register outputs the rearranged pixel data to the first multiplexor array in a first horizontal period, delays the rearranged pixel data by two channels to output to the first multiplexor array in a second horizontal period, wherein the first horizontal period and the second horizontal period alternated with each other.

Herein, the second multiplexor array includes at least n second multiplexors selecting one among at least two outputs of the positive and the negative digital-to-analog converter, and each output of the positive and the negative digital-to-analog converter is shared as an input of at least two second multiplexors.

Herein, an odd-numbered multiplexor among at least the n first multiplexors performs time-division on odd-numbered pixel data and outputs the time-divided odd-numbered pixel data in response to a selection control signal, and an even-numbered multiplexor performs time-division on even-numbered pixel data and outputs the time-divided even-numbered pixel data.

Herein, an odd-numbered demultiplexor among at least the n demultiplexors performs time-division on odd-numbered data lines to drive the time-divided odd-numbered data lines in response to the selection control signal, and an even-numbered demultiplexor performs time-division on even-numbered data lines to drive the time-divided even-numbered data lines.

Herein, the selection control signals have logical states inverted at least for each ½ horizontal period.

Herein, the polarity control signal has a logical state inverted for each horizontal period.

Herein, the first multiplexor array and the demultiplexor array alternately change the supplying sequence of the time-divided pixel data and the pixel voltage signal in response to the selection control signals.

Herein, the first multiplexor array and the demultiplexor array change the supplying sequence of the time-divided pixel data and the pixel voltage signal by at least a frame unit in response to the selection control signals.

Herein, the first multiplexor array and the demultiplexor array change the supplying sequence of the time-divided pixel data and the pixel voltage signal by at least one line unit in response to the selection control signals.

Herein, the first multiplexor array and the demultiplexor array change the supplying sequence of the time-divided pixel data and the pixel voltage signal by at least a line unit and a frame unit in response to the selection control signals.

Herein, the digital-to-analog converter array have adjacent pixel data converted into the pixel voltage signals with polarities opposite to each other in response to a polarity control signal.

In another aspect of the present invention, a method of driving a data in a liquid crystal display includes performing time-division on input pixel data to supply the time-divided pixel data, converting the pixel data into pixel voltage signals, and performing time-division on data lines to drive the time-divided data lines and supplying the pixel voltage signals.

The method further includes sequentially generating a sampling signal, sequentially latching the input pixel data, before performing the time-division on the pixel data in response to the sampling signal to supply the latched pixel data simultaneously, and buffering the pixel voltage signals before performing the time-division on the data lines.

In the method, the converting the pixel data into the pixel voltage signals is to convert each pixel data into each pixel voltage signal having a polarity different from adjacent pixel data.

The method further includes determining an input path to input the time-divided pixel data into alternately arranged positive and negative digital-to-analog converters in response to a polarity control signal before the converting into the pixel voltage signals, and determining an output path of the pixel voltage signal to determine the polarity of the pixel voltage signal in response to the polarity control signal after the converting into the pixel voltage signals.

In the method, the polarity control signal has a logical state inverted at least for each horizontal period.

In the method, the performing the time-division on the pixel data includes that odd-numbered multiplexor among at least n multiplexors performs time-division on odd-numbered pixel data in response to a first selection control signal, and even-numbered multiplexor performs time-division on even-numbered pixel data in response to a second selection control signal.

In the method, the performing the time-division on the data lines includes that odd-numbered demultiplexor among at least n demultiplexors performs time-division on odd-numbered data lines in response to the first selection control signal, and even-numbered demultiplexor performs time-division on even-numbered data lines in response to the second selection control signal.

In the method, the first and second selection control signals have logical states opposite to each other, wherein each logical state is inverted at least for each ½ horizontal period.

In the method, a supplying sequence of the time-divided pixel data is alternately changed when the pixel data are time-divided, and a supplying sequence of the pixel voltage signal is alternately changed when the data lines are-time-divided.

In the method, supplying sequences of the time-divided pixel data and the pixel voltage signal are alternately changed by one or more frame unit in response to the first selection control signal and the second selection control signal.

In the method, supplying sequences of the time-divided pixel data and the pixel voltage signal are changed by one or more line unit in response to the first and second selection control signal and the second selection control signal.

In the method, supplying sequences of the time-divided pixel data and the pixel voltage signal are changed by one or more line unit and frame unit in response to the first selection control signal and the second selection control signal.

The method further includes rearranging the input pixel data before the performing the time-division on the pixel data, and determining an output path of the pixel voltage signals in response to a polarity control signal after the converting the pixel voltage signals, to determine a polarity of the pixel voltage signals.

In the method, the rearranging the input data includes that the $(4k-3)^{th}$ pixel data (wherein k is a positive integer) and $(4k-2)^{th}$ pixel data among the input pixel data are exchanged with each other.

In the method, the rearranged input pixel data are outputted for a first horizontal period, delayed by two channels for a second horizontal period, and the first horizontal period and the second horizontal period are alternated with each other.

In the method, the performing the time-division on the pixel data includes that an odd-numbered multiplexor among at least the n multiplexors performs time-division on odd-numbered pixel data in response to a selection control signal, and an even-numbered multiplexor performs time-division on even-numbered pixel data.

In the method, the performing the time-division on the data lines includes that an odd-numbered demultiplexor among at least the n demultiplexors performs time-division on odd-numbered data lines to drive the time-divided odd-numbered data lines in response to the selection control signal, and an even-numbered demultiplexor performs time-division on even-numbered data lines to drive the time-divided even-numbered data lines.

In the method, the selection control signal has a logical state inverted at least for each ½ horizontal period.

In the method, the supplying sequence sequence of the time-divided pixel data is alternately changed in response to the selection control signals when the pixel data is time-divided, and the supplying sequence of the pixel voltage signal is alternately changed in response to the selection control signals when the pixel data is time-divided and driven.

In the method, the supplying sequence of the time-divided pixel data and the pixel voltage signal is alternately changed by at least a frame unit in response to the selection control signals.

In the method, the supplying sequence of the time-divided pixel data and the pixel voltage signal is changed by one or more line unit in response to the selection control signals.

In the method, the supplying sequence of the time-divided pixel data and the pixel voltage signal is changed by one or more frame unit and line unit in response to the selection control signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

With reference to FIGS. 4 to 16B, embodiments of the present invention will be explained as follows.

Figure 1:
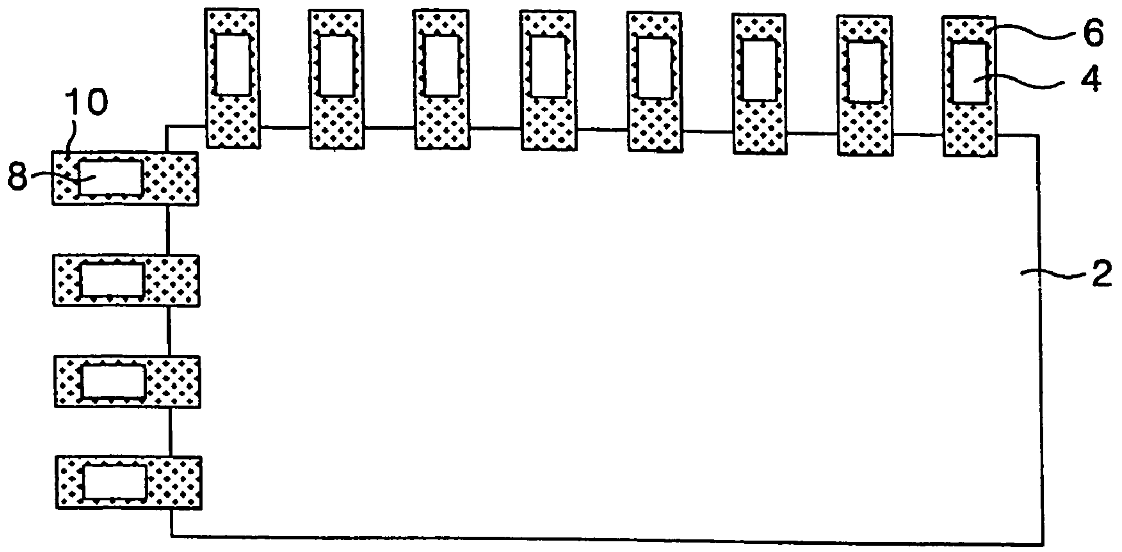
FIG.1 RELATED ART
FIG. 1 is a schematic view showing a configuration of a related art liquid crystal display.
Figure 2:
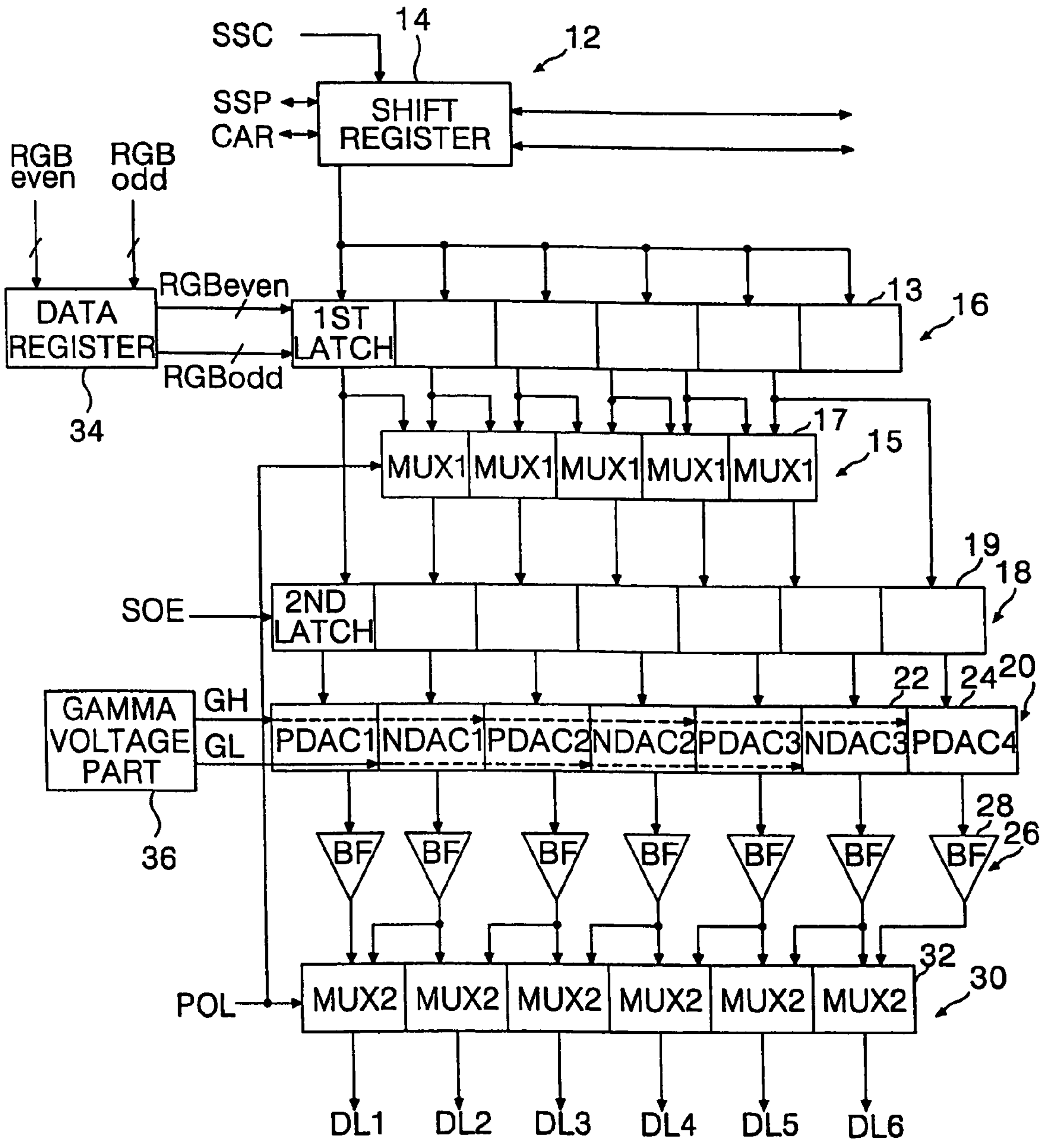
FIG. 2 RELATED ART
FIG. 2 is a detailed block diagram of the data-driving integrated circuit of FIG. 1.
Figure 3A:
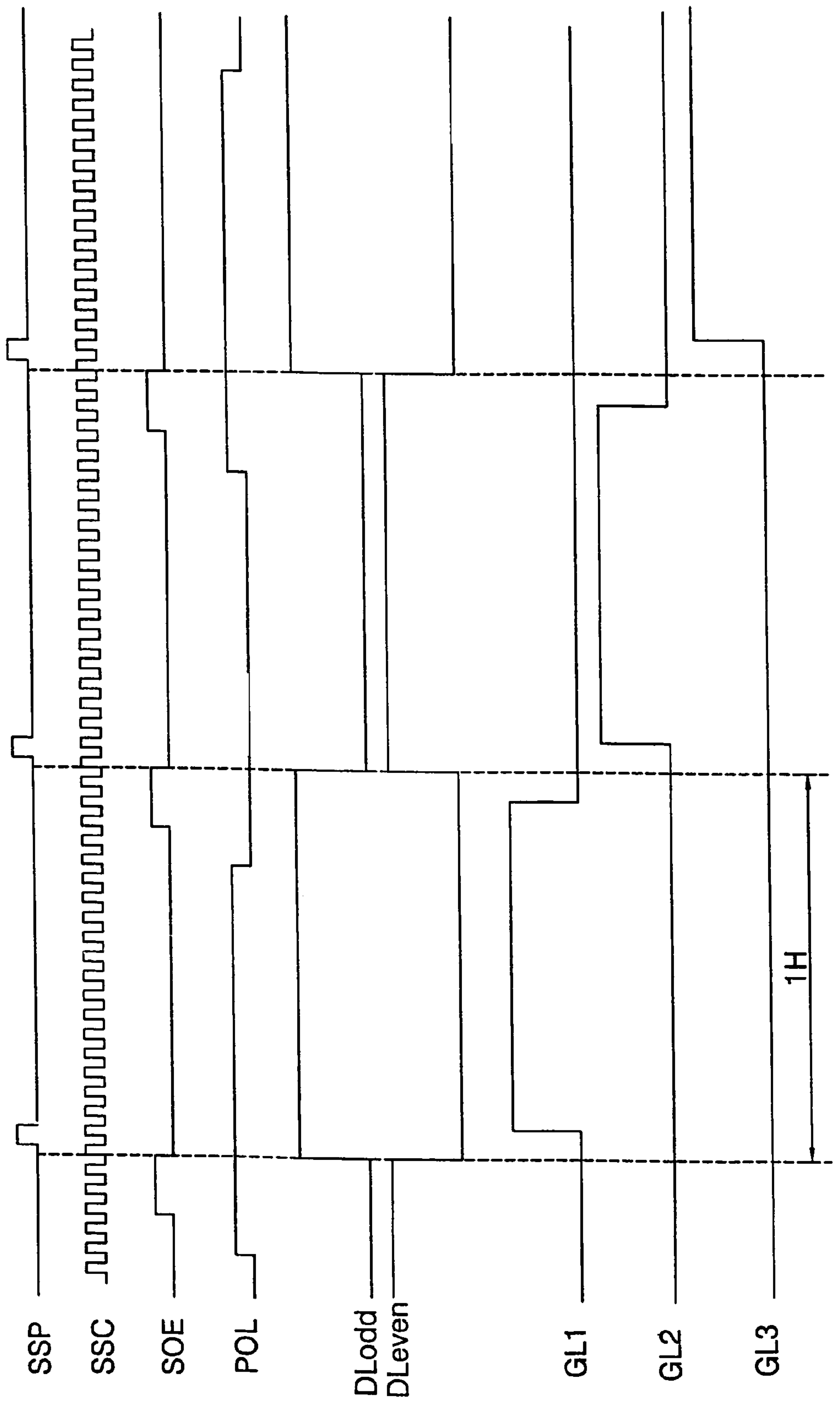
FIG.3A RELATED ART
FIGS. 3A and 3B are driving waveform diagrams of odd and even frames of the data-driving IC of FIG. 2.
Figure 3B:
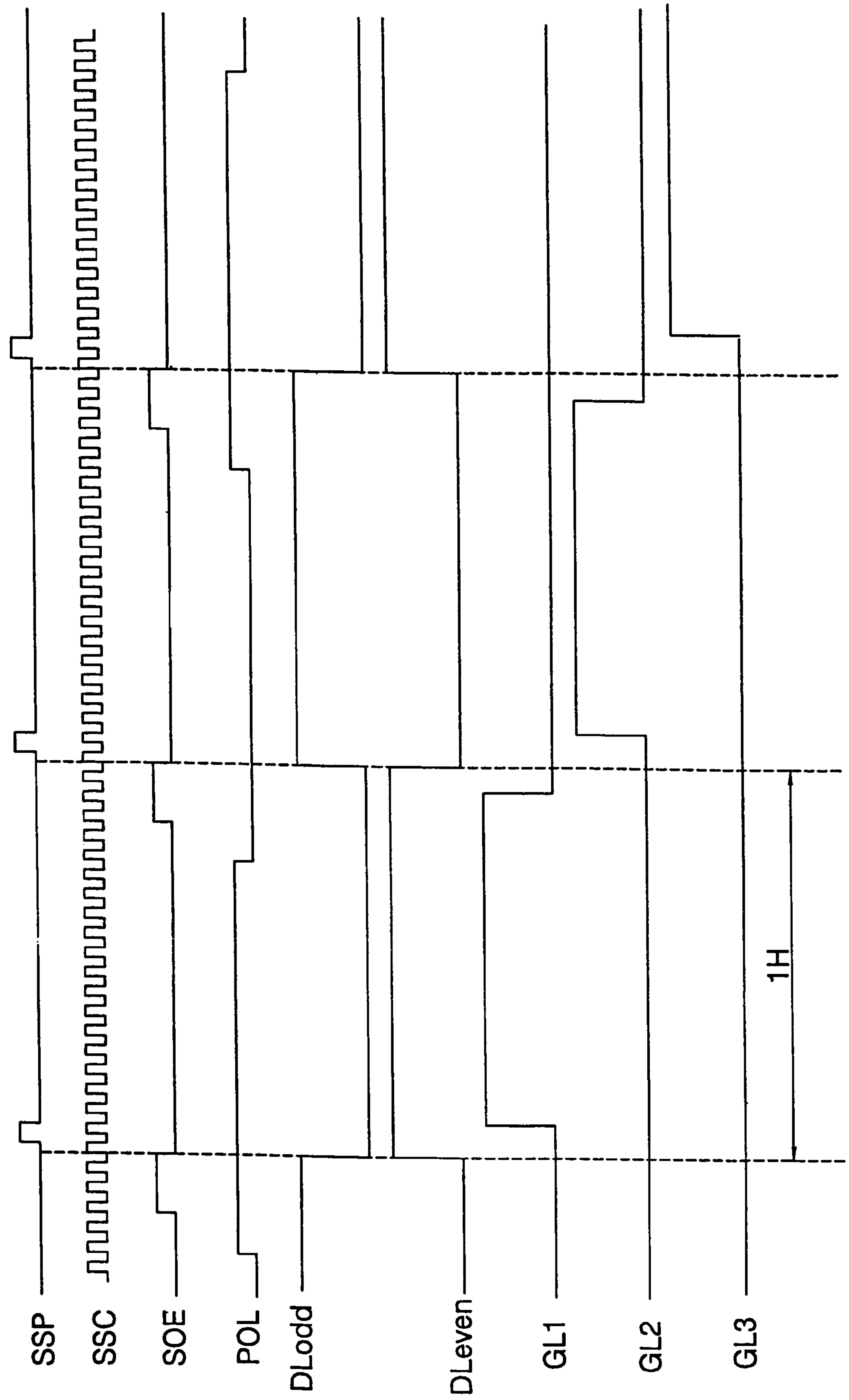
FIG.3B RELATED ART
Figure 4:
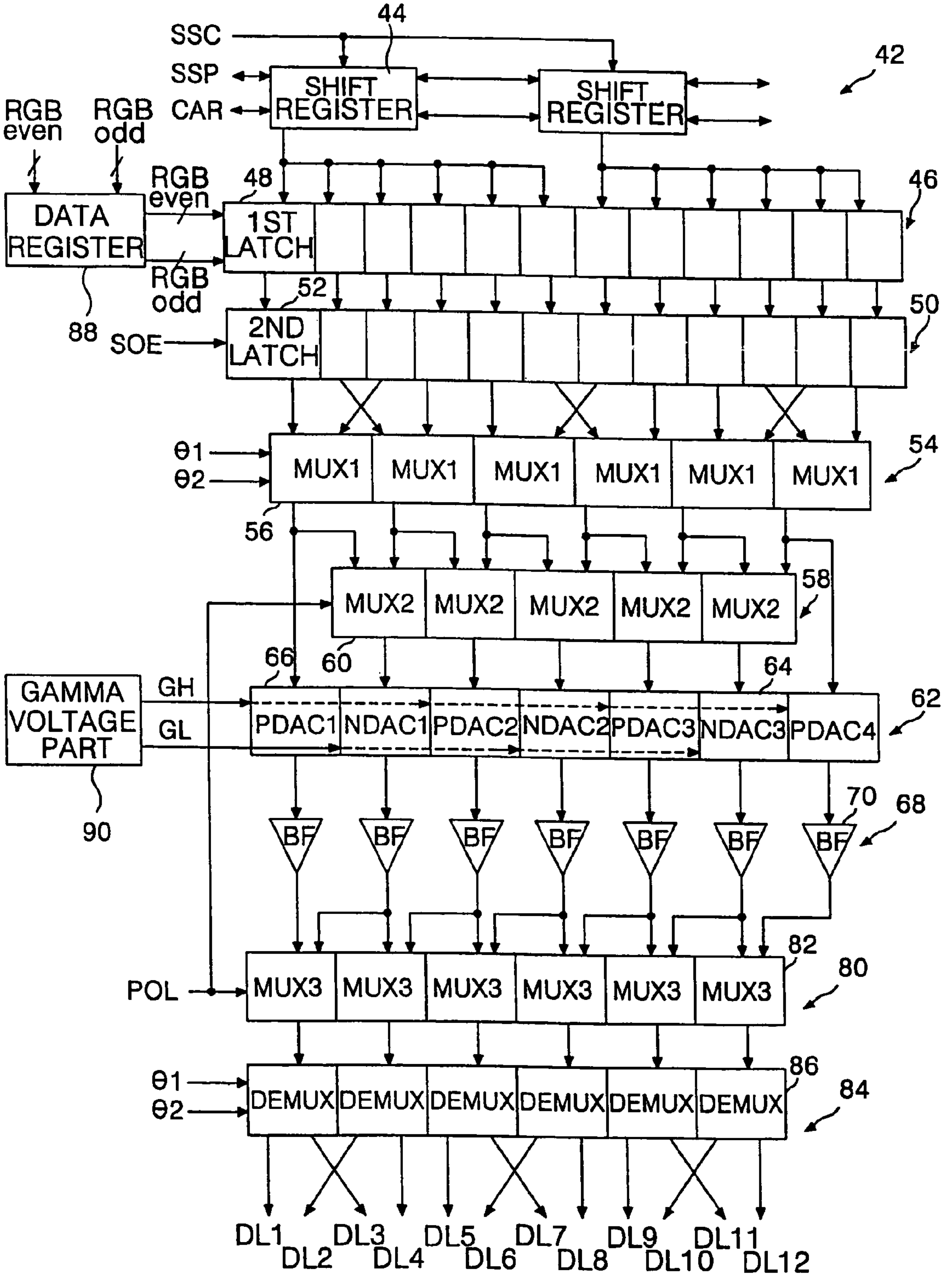
FIG. 4 is a detailed block diagram showing a configuration of a data-driving IC of a liquid crystal display according to an embodiment of the present invention.
Figure 5A:
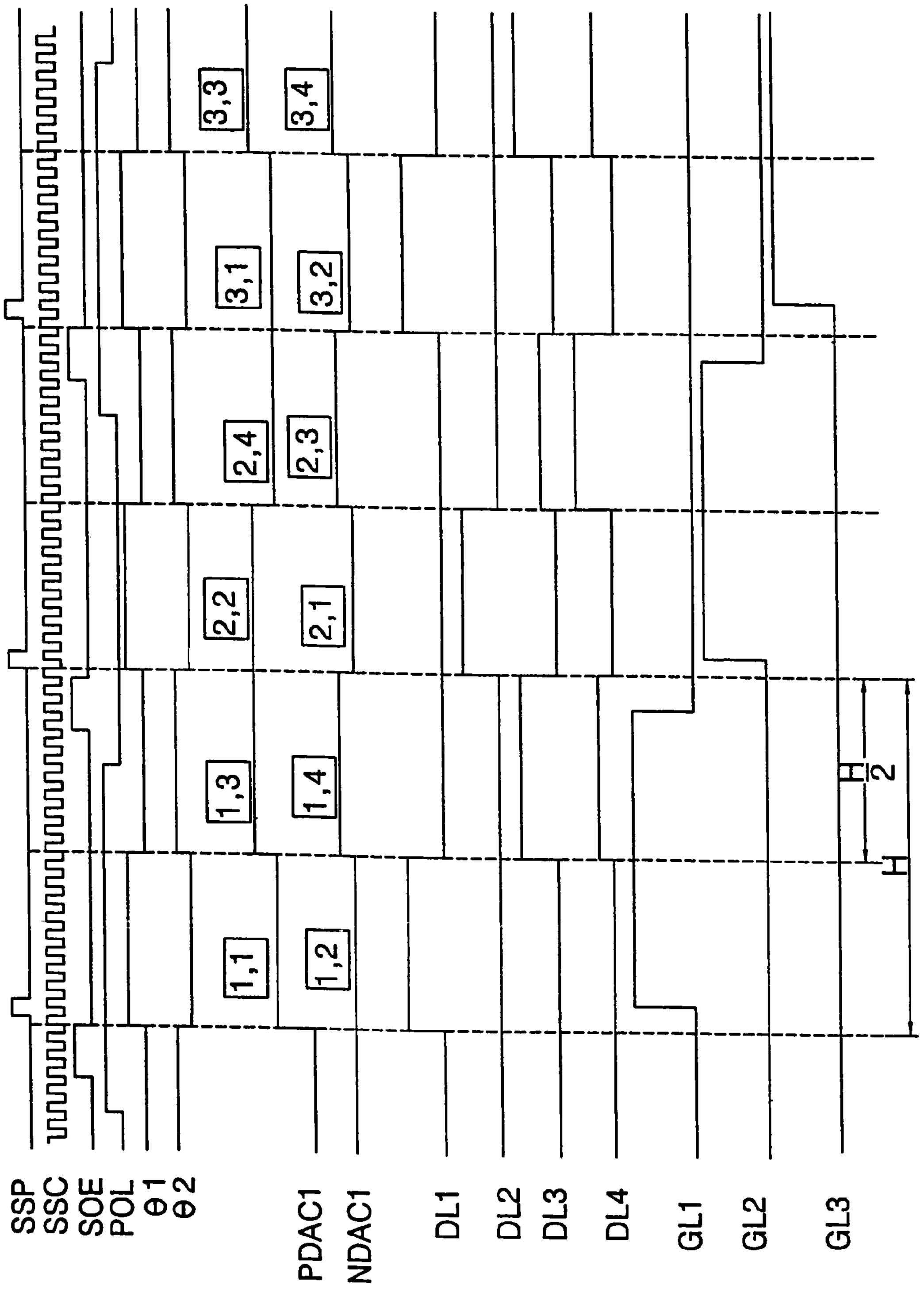
FIGS. 5A and 5B are driving waveform diagrams of odd and even frames of the data-driving IC of FIG. 4.
Figure 5B:
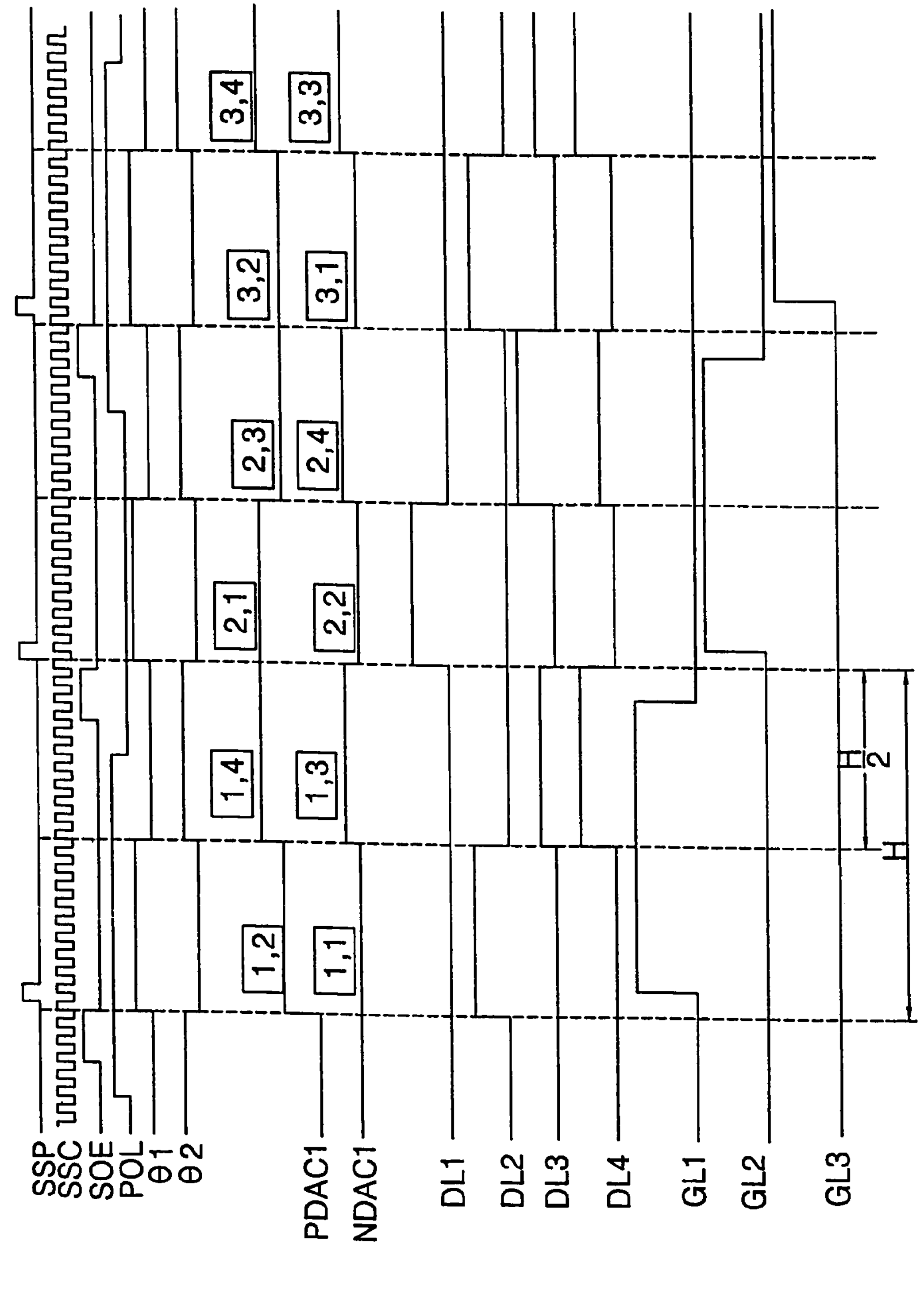

In FIG. 4 is a detailed block diagram of a configuration of a data-driving IC of a liquid crystal display according to an embodiment of the present invention, while FIGS. 5A and 5B are driving waveform diagrams of odd and even frames of the data-driving IC of FIG. 4

The data-driving IC, as illustrated FIG. 4, includes a shift register array 42 for applying a sequential sampling signal, first and second latch arrays 46 and 50 for latching and outputting pixel data R, G, and B in response to the sampling signal, a first multiplexor array 54 for time-dividing the pixel data R, G, and B from the second latch array 50 and outputting the time-divided pixel data, a second multiplexor array 58 for controlling a path of the pixel data R, G, and B from the first multiplexor array 54, a digital-to-analog converter (DAC) array 62 for converting the pixel data R, G, and B from the second multiplexor array 58 into pixel voltage signals, a buffer array 68 for buffering and outputting the pixel voltage signals from the DAC array 62, a third multiplexor array 80 for controlling a path of an output of the buffer array 68, and a demultiplexor array 84 for time-dividing the pixel voltage signals from the third multiplexor array 80 and outputting into data lines DL1 to DL2*n*. Further, the data-driving IC, illustrated in FIG. 4, includes a data register 88 for interfacing pixel data R, G, and B from a timing controller (not shown), and a gamma voltage part 90 for supplying positive and negative gamma voltages required in the DAC array 62.

Each data-driving IC having the configuration as mentioned above performs a time-divisional driving of the DAC array 62 using the first multiplexor array 54 and the demultiplexor array 84, thereby driving 2n data lines, which are twice the data lines of the related art explained above, using (n+1) DAC's 64 and 66 and (n+1) buffers 70. The present data-driving IC has 2n channel data outputs so as to drive 2n data lines. However, FIG. 4 illustrates only 12 channels DL1 to DL12 of the 2n channels of the data-driving IC when n is 6, for example.

The data register 88 interfaces the pixel data from the timing controller to apply the pixel data to the first latch array 46. Particularly, the timing controller divides the pixel data into even pixel data RGBeven and odd pixel data RGBodd for the purpose of reducing a transmission frequency and supplies the divided pixel data through each transmission line to the data register 88. The data register 88 outputs the input even and odd pixel data RGBeven an RGBodd to the first latch array 46 over each transmission line. Herein, each of the even pixel data RGBeven and the odd pixel data RGBodd includes red(R), green(G), and blue(B) pixel data.

The gamma voltage part 90 further divides a plurality of gamma reference voltages from a gamma reference voltage generator (not shown) for each gray level to output the divided gamma reference voltages.

The shift register array 42 generates and applies sequential sampling signals to the first latch array 46. To this end, the shift register array 46 is comprised of 2n/6 (herein, n=6) shift registers 44. The shift register 44 at the first stage shown in FIG. 4 shifts a source start pulse SSP from the timing controller in response to a source sampling clock signal SSC and output the shifted source start pulse as a sampling signal. At the same time, the shift register 44 applies the shifted source start pulse to the shift register 44 at the next stage as a carry signal CAR. The source start pulse SSP is applied for each horizontal period, as shown in FIGS. 5A and 5B, and is shifted for each source sampling clock signal SSC to be outputted as a sampling signal.

The first latch array 46 samples and latches the pixel data RGBeven and RGBodd from the data register 88 by a certain unit in response to the sampling signal from the shift register array 42. The first latch array 46 consists of 2n first latches 48 for latching 2n (herein, for example, n=6) pixel data R, G, and B, each of which has a size corresponding to the bit number (i.e., 3 bits or 6 bits) of the pixel data R, G, and B. Such a first latch array 46 samples and latches the even pixel data RGBeven and the odd pixel data RGBodd (i.e., each 6 pixel data) for each sampling signal, and then outputs the latched data simultaneously.

The second latch array 50 simultaneously latches the pixel data R, G, and B from the first latch array 46 in response to a source output enable signal SOE from the timing controller, and then output the latched data. The second latch array 50 includes 2n (herein, for example, n=6) second latches 52 similar to the first latch array 46. The source output enable signal SOE is generated for each horizontal period, as shown in FIGS. 5A and 5B.

The first multiplexor array 54 performs an n time-division of 2n (herein, for example, n=2) pixel data from the second latch array 50 for each H/2 period to output the time-divided pixel data in response to first and second selection control signals θ1 and θ2 from the timing controller. To this end, the first multiplexor array 54 consists of n first multiplexors 56, each of which selects any one output of the two second latches 52 in the second latch array 50. In other words, each of the first multiplexors 52 time-divides the outputs of the two second latches 52 for each ½ period to apply the time-divided output. More specifically, for the dot inversion driving, the odd-numbered first multiplexor 56 selects any one of the outputs of the two odd-numbered second latches 52 in response to the first selection control signal θ1 while the even-numbered first multiplexor 56 selects any one of the outputs of the two even-numbered second latches 52 in response to the second selection control signal θ2.

For example, the first first multiplexor 56 selects to output a first pixel data from the first second latch 52 at the first half of a one horizontal period, and a third pixel data from the third second latch 52 at the second half, in response to the first selection control signal θ1. The second first multiplexor 56 selects to output a second pixel data from the second second latch 52 at the first half of the one horizontal period, and a fourth pixel data from the fourth second latch 52 at the second half, in response to the second selection control signal θ2. The first selection control signal θ1 and the second selection control signal θ2 have their polarity opposite to each other, as illustrated in FIG. 5A and 5B, and inverted for each horizontal period.

The second multiplexor array 58 determines a path of the pixel data R, G, and B supplied from the first multiplexor array 54 in response to a polarity control signal POL from the polarity controller 92. To this end, the second multiplexor array 54 includes (n−1) second multiplexors 60. Each of the second multiplexors 60 receives the output signals of the two adjacent first multiplexors 56 to selectively output the received signals in response to the polarity control signal POL. Herein, the outputs of the remaining first multiplexors 56 excluding the first and last first multiplexors 56 are commonly inputted to the two adjacent second multiplexors 60. The outputs of the first and last first multiplexors 56 are commonly inputted to the PDAC 66 and the second multiplexor 60. The second multiplexor array 58 having the configuration as mentioned above allows the pixel data R, G, and B received from each first multiplexor 56 to be progressed into the DAC array 62 as they are, or to be progressed into the DAC array 62 with being shifted toward the right side by one position in response to the polarity control signal POL. The polarity control signal POL has a polarity inverted for each horizontal period, as shown in FIGS. 5A and 5B, for a dot inversion driving. As a result, the second multiplexor array 58 allows each pixel data R, G, and B from the first multiplexor array 54 to be outputted to PDAC's 64 or NDAC's 66 alternately arranged in the DAC array 62 in response to the polarity control signal POL, thereby controlling polarities of the pixel data R, G, and B.

For instance, in a first horizontal period, the first and third pixel data sequentially outputted from the first first multiplexor 56 are directly supplied to the PDAC1 66 without passing through the second multiplexor 60, whereas the second and fourth pixel data sequentially outputted from the second first multiplexor 56 are supplied to the NDAC1 64 through the first second multiplexor 60. Subsequently, in a second horizontal period, the first and third pixel data are supplied to the NDAC1 64 through the first second multiplexor 60, whereas the second and fourth pixel data are supplied to the PDAC2 66 through the second second multiplexor 60.

The DAC array 62 converts the pixel data R, G, and B from the second multiplexor array 58 into pixel voltage signals with the aid of positive and negative gamma voltages GH and GL received from the gamma voltage part 90 to output the pixel voltage signals. To this end, the DAC array 62 includes (n+1) PDAC's 66 and (n+1) NDAC's 64, which are alternately arranged in parallel to each other for a dot inversion driving. The PDAC 66 converts the pixel data R, G, and B from the second multiplexor array 58 into positive pixel voltage signals using the positive gamma voltages GH. On the other hand, the NDAC 64 converts the pixel data R, G, and B from the second multiplexor array 58 into negative pixel voltage signals using the negative gamma voltages GL. Such PDAC 66 and NDAC 64 convert the digital pixel data inputted for each ½ horizontal period into analog pixel voltage signals.

Figure 8:
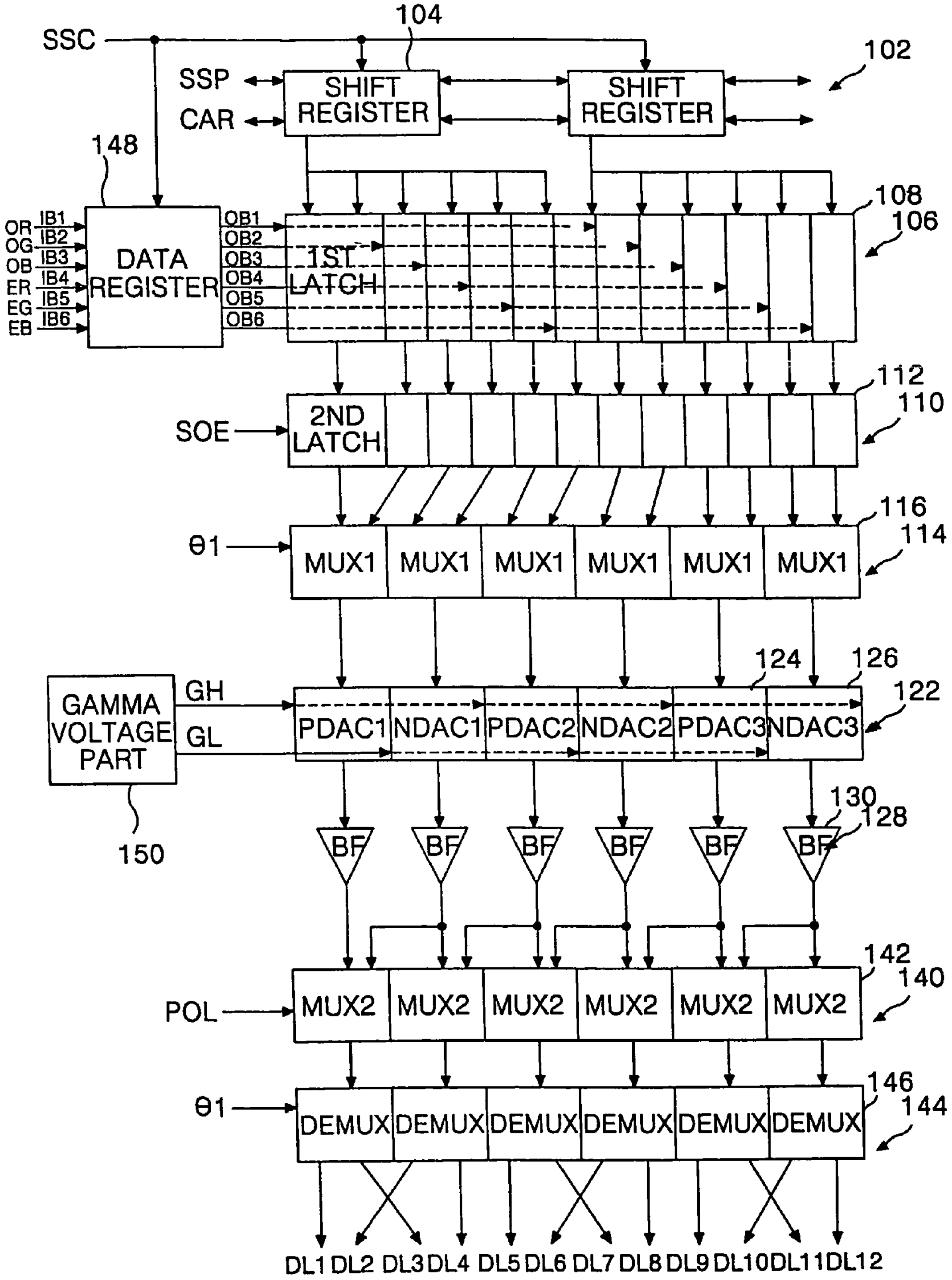
FIG. 8 is a detailed block diagram showing a configuration of a data-driving IC according to another embodiment of the present invention.

For instance, the PDAC1 66 converts odd pixel data [1,1] and [1,3] inputted with being time-divided in the first horizontal period into pixel voltage signals, as shown in FIGS. 5A and 5B, to output the converted data. At the same time, the NDAC2 also converts even pixel data [1,2] and [1,4] inputted with being time-divided in the first horizontal period into pixel voltage signals, as shown in FIGS. 8 and 9, to output the converted data. Then, in a second horizontal period, the NDAC2 64 converts odd pixel data [2,1] and [2,3] inputted time-divisionally into pixel voltage signals to output the converted data. At the same time, the PDAC 66 converts even pixel data [2,2] and [2,4] inputted with being time-divided in the second horizontal period into pixel voltage signals to output them. By such a DAC array 62, 2n pixel data are time-divided n by n for each ½ horizontal period to be converted into pixel voltage signals and then outputted.

Each of (n+1) buffers 70 included in the buffer array 68 buffers and outputs a pixel voltage signal from each of the PDAC's 66 and the NDAC's 64 of the DAC array 62.

The third multiplexor array 80 determines a path of each pixel voltage signal from the buffer array 68 in response to the polarity control signal POL from the timing controller. To this end, the third multiplexor array 80 includes n (herein, for example, n=6) third multiplexors 82. Each of the third multiplexors 82 selects any one output of the two adjacent buffers 70 in response to the polarity control signal POL. Herein, the outputs of the remaining buffers 70 excluding the first and last buffers 70 are commonly inputted to the two adjacent third multiplexors 82. The third multiplexor array 82 having the configuration as mentioned above allows the pixel voltage signals from the buffers 70 excluding the last buffer 70 to be outputted as they are at a corresponding one to one relationship in response to the polarity control signal POL. Further, the third multiplexor array 82 allows the pixel voltage signals from the remaining buffers 70 excluding the first buffer 70 to be outputted to the demultiplexors 86 at a corresponding one to one relationship in response to the polarity control signal POL. The polarity control signal POL, for a dot inversion driving, has a polarity inverted for each horizontal period, as shown in FIGS. 5A and 5B, similar to the second multiplexor array 58. As mentioned above, the third multiplexor array 80, along with the second multiplexor array 58, determines polarities of the pixel voltage signals in response to the polarity control signal POL. As a result, the pixel voltage signal outputted from the third multiplexor array 80 has a polarity opposite to the adjacent pixel voltage signals and has its polarity inverted for each horizontal period.

The demultiplexor array 84 selectively applies the pixel voltage signals from the third multiplexor array 80 to 2n data lines in response to the first and second selection control signals θ1 and θ2 from the timing controller. To this end, the demultiplexor array 84 consists of n demultiplexors 86, each of which performs a time-division of the pixel voltage signal from each third multiplexor 82 to apply the time-divided signal to two data lines. More specifically, the odd-numbered demultiplexors 86 performs a time-division of the output signals of the odd-numbered third multiplexors 82 in response to the first selection control signal θ1 to apply the time-divided signals to two odd-numbered data lines. The even-numbered demultiplexors 86 performs a time-division of the outputs of the two even-numbered third multiplexors 82 in response to the second selection control signal θ2 to apply them to two even-numbered data lines. The first and second selection control signals θ1 and θ2, as illustrated in FIGS. 5A and 5B, have a polarity opposite to each other and inverted for each horizontal period similar to those applied to the first multiplexor array 54.

For example, the first demultiplexor 86 selectively applies an output the first third multiplexor 82 to the first and third data lines DL1 and DL3 for each ½ horizontal period in response to the first selection control signal θ1, as shown in FIGS. 5A and 5B. The second demultiplexor 86 selectively applies the output of the second third multiplexor 82 to the second and fourth data lines DL2 and DL4 for each ½ horizontal period in response to the second selection control signal θ2, as shown in FIGS. 5A and 5B.

Particularly, the first DEMUX 86 responds to the first selection control signal θ1 to supply the pixel voltage signal [1,1] to the first data line D1 at the first half of the first horizontal period when the first gate line GL1 is activated, and to supply the pixel voltage signal [1,3] to the third data line D3 at the second half. At the same time, the second DEMUX 86 responds to the second selection control signal θ2 to supply the pixel voltage signal [1,2] to the second data line D2 at the first half of the first horizontal period, and to supply the pixel voltage signal [1,4] to the fourth data line D4 at the second half. And, the first DEMUX 86 supplies each of pixel voltage signals [2,1] and [3,1] to the first data line DL1 at each first half of the second horizontal period H2 and the third horizontal period H3 and supplies each of pixel voltage signals [2,3] and [3,3] to the third data line. DL3 at each second half. Simultaneously, the second DEMUX 86 supplies each of pixel voltage signals [2,2] and [3,2] to the second data line DL2 at each first half of the second horizontal period H2 and the third horizontal period H3 and supplies each of pixel voltage signals [2,4] and [3,4] to the fourth data line DL4 at each second half.

By the data-driving IC having the configuration as mentioned above, polarities of pixel voltage signals outputted to the odd data lines, such as DL1 and DL3, etc., are opposite to those of pixel voltage signals outputted to the even data lines, such as DL2 and DL4, etc., as shown in FIGS. 5A and 5B. Further, polarities of the odd data lines DL1, DL3, . . . and the even data lines DL2, DL4, . . . are inverted and for each frame for each horizontal period at which the gate lines GL1, GL2, GL3, . . . are sequentially driven.

Figure 6:
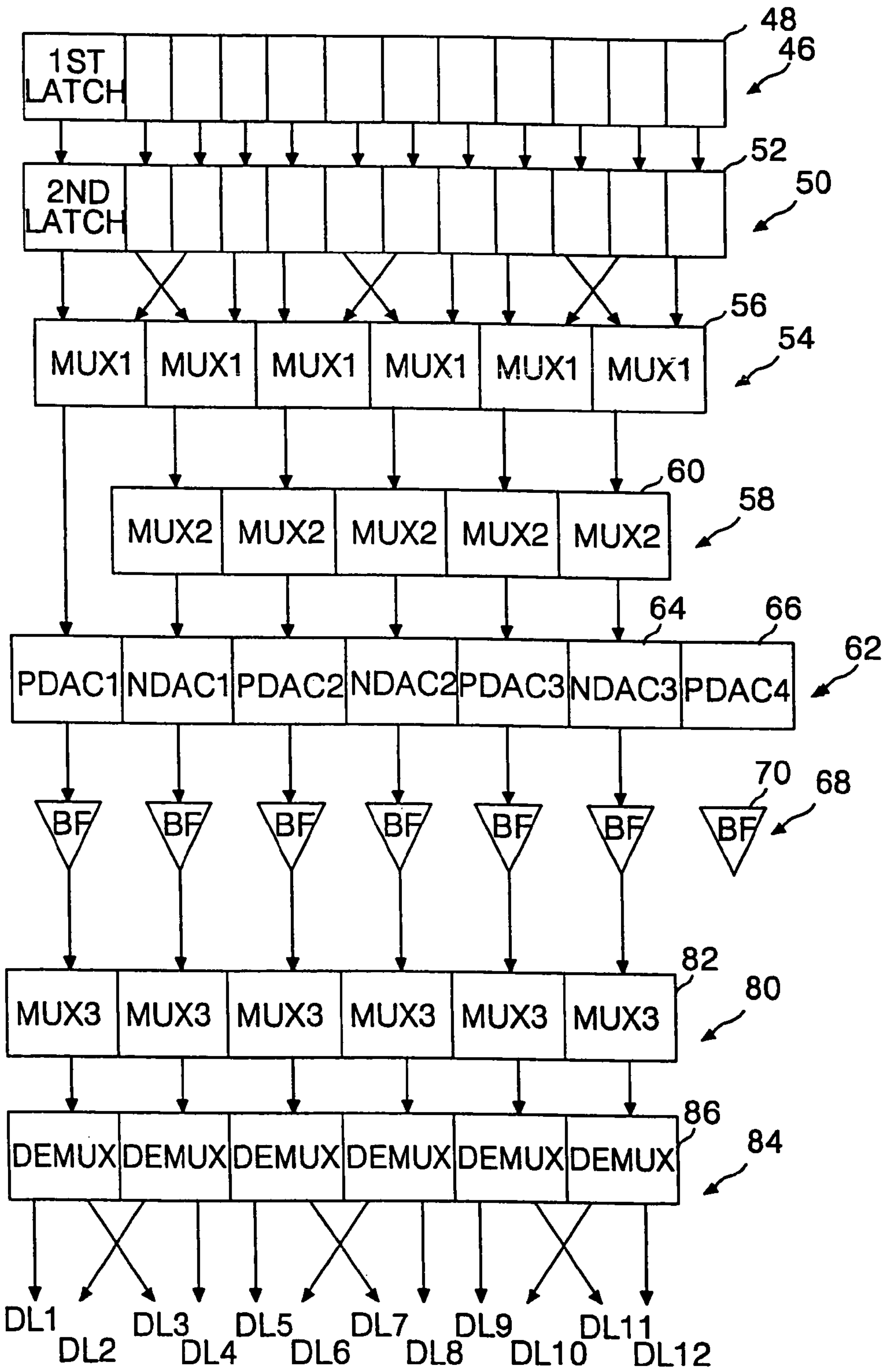
FIG. 6 is a flow diagram of data in the data-driving IC of FIG. 4, when a polarity control signal POL is in a low state.
Figure 7:
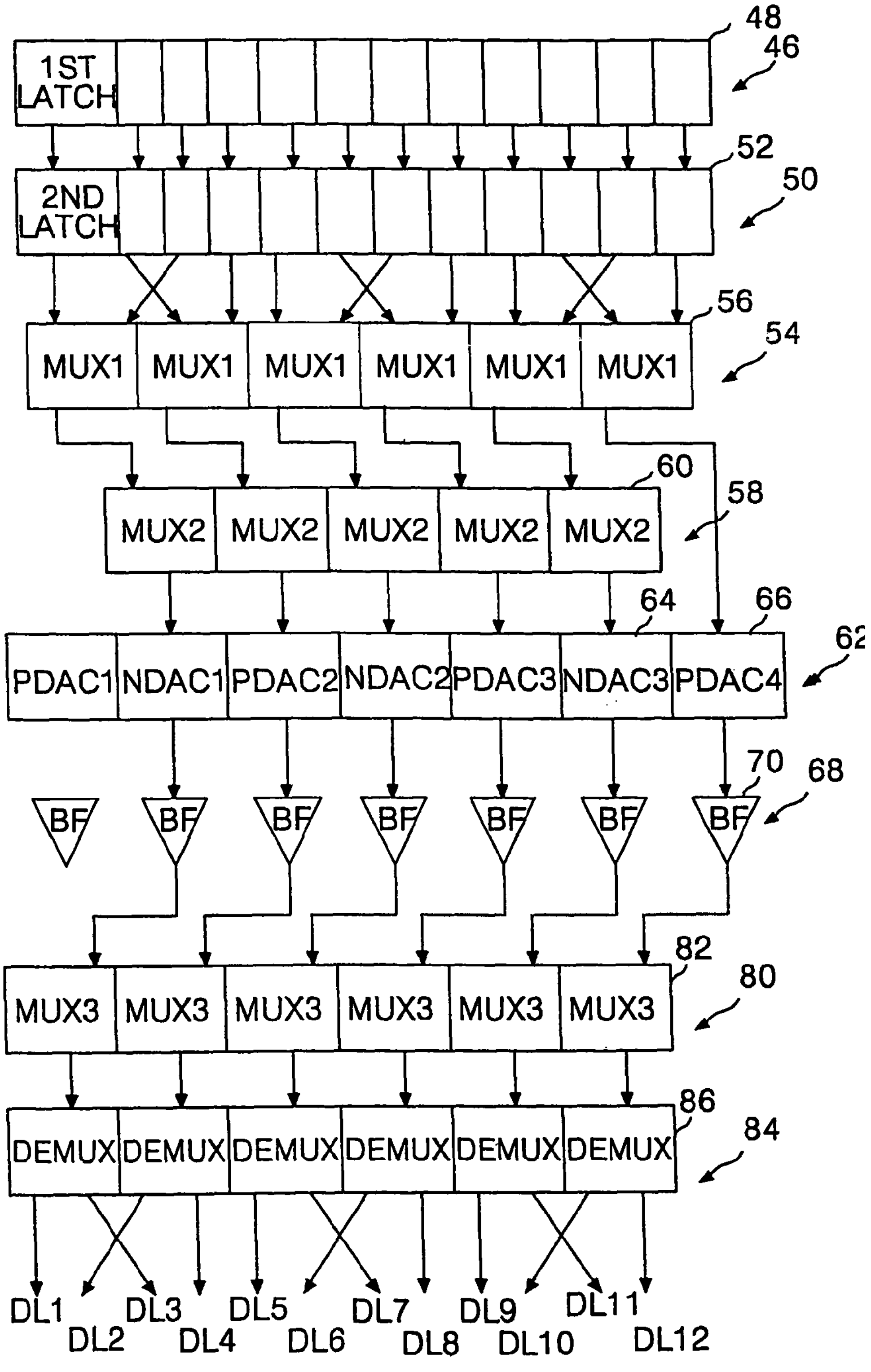
FIG. 7 is a flow diagram of data in the data-driving IC of FIG. 4, when a polarity control signal POL is in a high state.

FIGS. 6 and 7 illustrate a path of a pixel data according to the polarity control signal POL within the data-driving IC shown in FIG. 4. When the polarity control signal is in a low state (or a high state), the second multiplexor array 58 allows 6 pixel data outputted from the first and second latch arrays 46 and 50 and the first multiplexor array 54 to be inputted to the remaining PDAC1 66 to NDAC3 64 excluding the PDAC4 66, as shown in FIG. 6, thereby converting the inputted pixel data into pixel voltage signals. In this case, the output of the first first multiplexor 56 is applied to the PDAC1 66 as it is to be converted into a pixel voltage signal. The third multiplexor array 80 applies the pixel voltage signals inputted through the buffer array 68 from the remaining PDAC1 66 to NDAC3 64 to the demultiplexors 86 at a corresponding one to one relationship. Each of the demultiplexors 86 selectively applies a pixel voltage signal inputted from each third multiplexor 82 to 12 data lines DL1 to DL12.

Otherwise, when the polarity control signal POL is in a high state (or a low state), the second multiplexor array 58 shifts 6 pixel data outputted from the first and second latch arrays 46 and 50 and the first multiplexor array 54 to the right and apply the shifted pixel data to the remaining NDAC1 64 to PDAC3 66 excluding the PDAC1 66, as shown in FIG. 7, thereby converting the applied shifted pixel data into pixel voltage signals. In this case, the output of the last first multiplexor 56 is applied to the PDAC4 66 as it is to be converted into a pixel voltage signal. The third multiplexor array 82 shifts the applied pixel voltage signals through the buffer array 68 from the NDAC1 64 to the PDAC4 64 to the left, thereby applying the shifted pixel voltage signals to the demultiplexors 86 at a corresponding one to one relationship. Each of the demultiplexors 86 selectively applies a pixel voltage signal inputted from each third multiplexor 82 to 12 data lines DL1 to DL12.

As described above, the data-driving IC according to the present invention performs a time-divisional driving of the DAC array, thereby driving 2n channel data lines using (n+1) DAC's. In other words, each data-driving IC including (n+1) DAC's drives 2n data lines, so that it reduces the number of DAC's to ½.

Figure 9A:
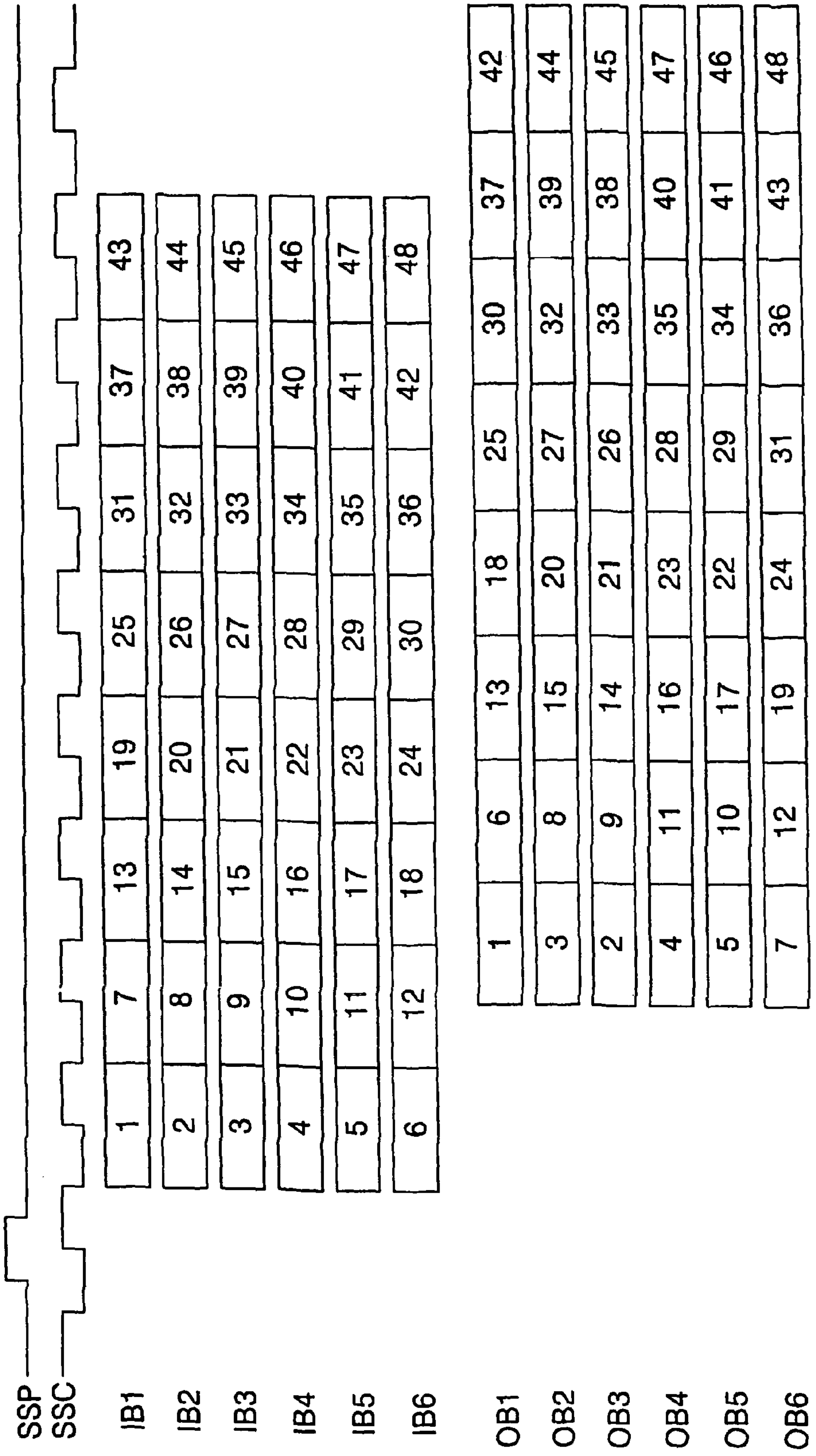
FIGS. 9A and 9B are driving waveform diagrams of the data register of FIG. 8.
Figure 9B:
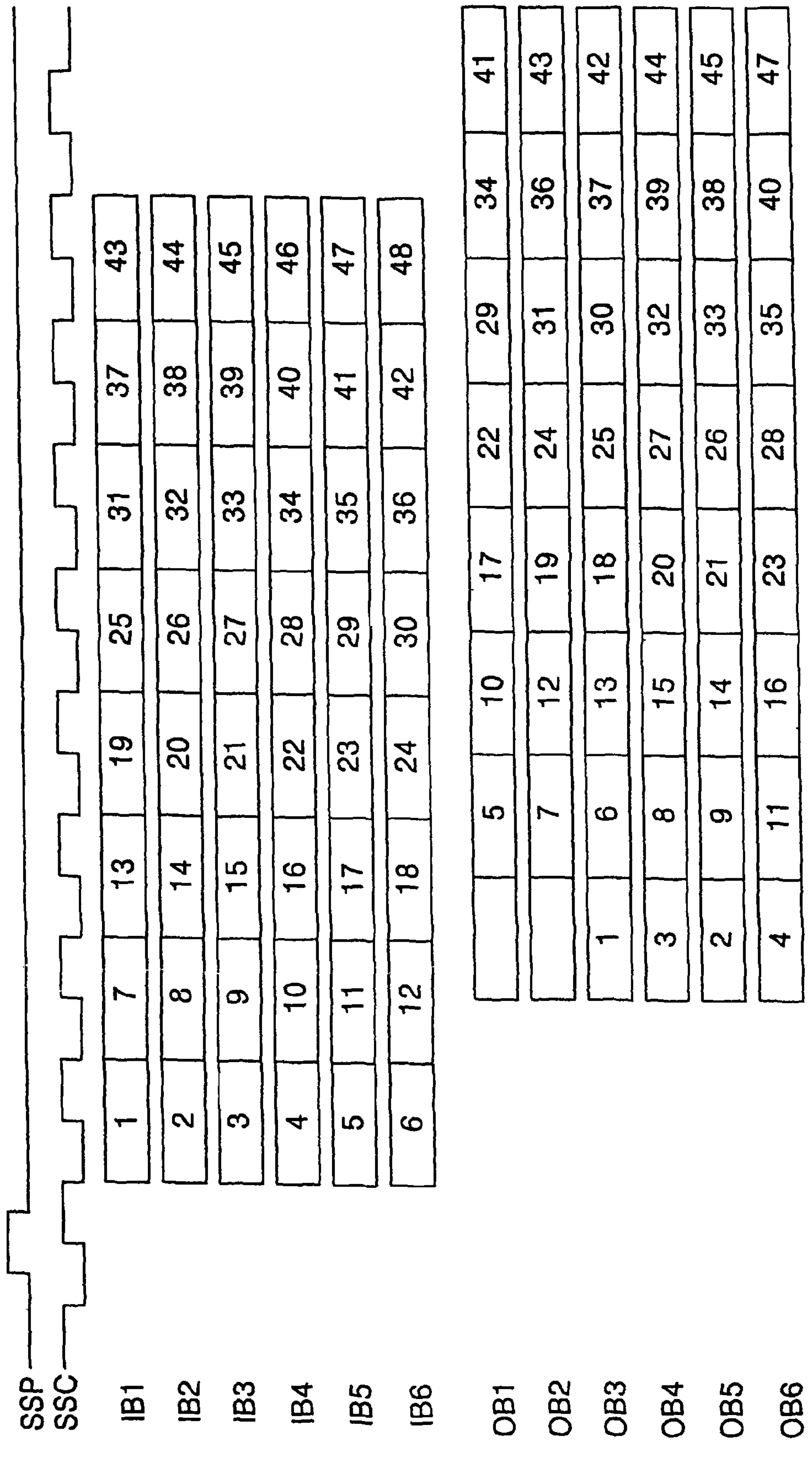
Figure 10A:
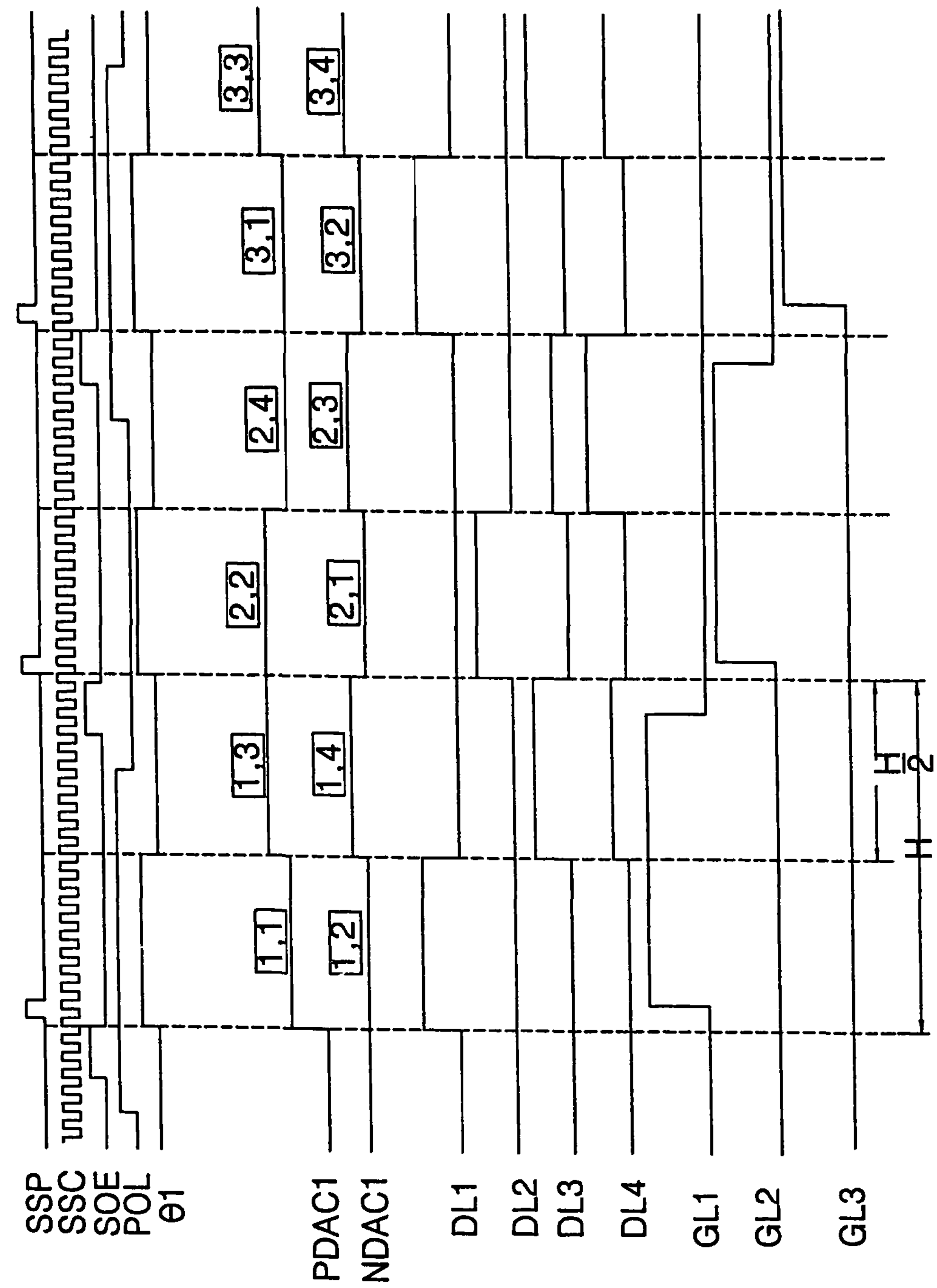
FIGS. 10A and 10B are driving waveform diagrams of odd and even frames of the data-driving IC of FIG. 8.
Figure 10B:
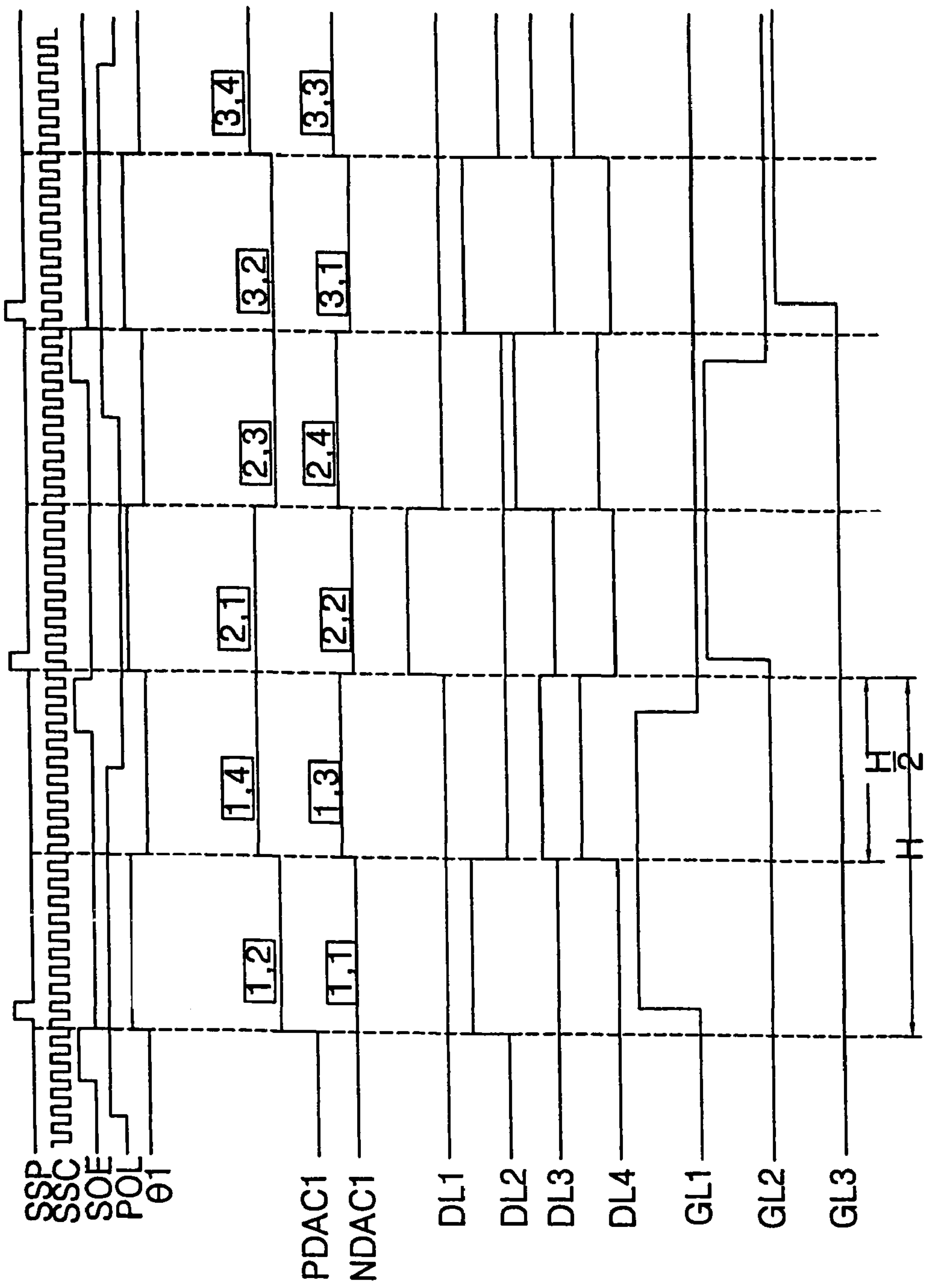

FIG. 8 is a detailed block diagram of a configuration of a data-driving IC of a liquid crystal display according to another embodiment of the present invention. FIGS. 10A and 10B are driving waveform diagrams of odd and even frames of the data-driving IC shown in FIG. 8. And, FIGS. 9A and 9B are driving waveform diagrams of the data register, shown in FIG. 8, during the $(m-1)^{th}$ horizontal period and the $m^{th}$ horizontal period.

The data-driving IC, as illustrated FIG. 8, includes a shift register array 102 for applying a sequential sampling signal, first and second latch arrays 106 and 110 for latching and outputting pixel data R, G, and B in response to the sampling signal, a first multiplexor array 114 for performing a time-division of the pixel data R, G, and B from the second latch array 110 and outputting the time-divided pixel data, a digital-to-analog converter (DAC) array 122 for converting the pixel data R, G, and B from the first multiplexor array 114 into pixel voltage signals, a buffer array 128 for buffering and outputting the pixel voltage signals from the DAC array 122, a second multiplexor array 140 for controlling a path of an output of the buffer array 128, and a demultiplexor array 1104 for performing a time-division of the pixel voltage signals from the second multiplexor array 140 to output the time-divided signals to data lines DL1 to DL2*n*.

Further, the data-driving IC, illustrated in FIG. 8, includes a data register 148 for rearranging and outputting pixel data R, G, and B from a timing controller (not shown), and a gamma voltage part 150 for supplying positive and negative gamma voltages required in the DAC array 122.

Each data-driving IC having the configuration as mentioned above performs a time-divisional driving of the DAC array 122 using the first multiplexor array 114 and the demultiplexor array 1104, thereby driving 2n data lines, which are twice the data lines of the related art, using (n+2) DAC's 124 and 126 and buffers 130. The present data-driving IC has 2n channel data outputs so as to drive 2n data lines. However, FIG. 8 illustrates only 12 channels DL1 to DL12 of the 2n channels of the data-driving IC when n is 6, for example.

The gamma voltage part 150 further divides a plurality of gamma reference voltages inputted from a gamma reference voltage generator (not shown) by grey levels to output.

The data register 148 appropriately rearranges the pixel data from the timing controller for a dot inversion driving to apply the rearranged pixel data to the first latch array 106. The data register 148 receives the odd pixel data OR, OG, and OB and the even pixel data ER, EG, and EB from the timing controller through the first to the sixth input bus IB1 to IB6, simultaneously. And, the data register 148 rearranges the inputted odd pixel data OR, OG, and OB and the even pixel data ER, EG, and EB and outputs the rearranged pixel data through the first to the sixth output buses OB1 to OB6.

More specifically, the data register 148, as shown in FIGS. 9A and 9B, receives the six pixel data OR, OG, OB, ER, EG, and EB through the first to the sixth input buses IB1 to IB6, respectively. In this case, the data register 148 receives six pixel data OR, OG, OB, ER, EG, and EB for each period of shift clock signal SSC on the basis of the source start pulse SSP.

And the data register 148, as shown in FIG. 9A, alternately outputs the $(4k-2)^{th}$ (herein, k is a positive number) data and the $(4k-1)^{th}$ data among the pixel data of one horizontal line portion in the (m−1)$^{th}$ horizontal period. For instance, the second data and the third data are exchanged with each other, the sixth data and the seventh data, and the tenth data and the eleventh data to be outputted, as shown in FIG. 9. This is for inputting each pair of pixel data, which are to be converted to the pixel voltage signal with the same polarity, to each first MUX 116. In this way, since the pixel data OR, OG, OB, ER, EG, and EB inputted from the data register 148 are rearranged to be outputted, it can eliminate the MUX array that determines the path of the pixel data in accordance with the polarity control signal POL between the first MUX array 114 and the DAC array 122.

Also, in the m$^{th}$ horizontal period, the data register 148, as shown in FIG. 9B, exchanges the (4k−2)$^{th}$ (herein, k is a positive number) data and the (4k−1)$^{th}$ data among the pixel data of one horizontal line portion and delays by two channels for their polarity inversion, that is, shifts to output through the output buses OB1 to OB6. For instance, the data register 148 shifts the first pixel data to the third output bus OB3, the exchanged third pixel data to the fourth output bus OB4, the exchanged second pixel data to the fifth output bus OB5, and the fourth pixel data to the sixth output bus OB6, then outputs the shifted pixel data. And, in the next clock, the fifth pixel data is shifted to the first output bus OB1, the exchanged seventh pixel data to the second output bus OB2, and the exchanged sixth pixel data to the third output bus OB3, then they are outputted.

In this way, the pixel data ORO, OGO, OBO, ERO, EGO, and EBO rearranged to be outputted at the data register 148 are delayed for a specific time compared to the inputted pixel data OR, OG, OB, ER, EG, and EB in order to secure time for rearrangement, then they are outputted. In other words, they are delayed by about ⅔ clock and outputted.

The shift register array 102 generates and applies sequential sampling signals to the first latch array 106. To this end, the shift register array 102 is comprised of 2n/6 (herein, for example, n=6) shift registers 104. The shift register 104 at the first stage of FIG. 8 shifts a source start pulse SSP from the timing controller in response to a source sampling clock signal SSC and output the shifted source start pulse as a sampling signal, and at the same time applies to the shift register 104 at the next stage as a carry signal CAR. The source start pulse SSP is applied for each horizontal period, as shown in FIGS. 10A and 10B, and is shifted for each source sampling clock signal SSC to be outputted as a sampling signal.

The first latch array 106 samples a set of the six pixel data inputted from the data register 148 through the first to the sixth output buses OB1 to OB6 in response to the sampling signal from the shift register array 102 and latches the sampled pixel data. The first latch array 106 consists of 2n first latches 48 for latching 2n (herein, n=6) pixel data R, G, and B, each of which has a size corresponding to the bit number (i.e., 6 bits or 8 bits) of the pixel data R, G, and B. Also, the first latch array 106, as shown in FIG. 9B, includes two first latches (not shown) in case it is inputted by being shifted by two channels.

For example, the pixel data are latched in the order of 1, 3, 2, 4, 5, 7, 6, 8, 9, 11, 10, 12, which are rearranged at the data register 148, at the 1$^{st}$ first latch 108 to the 12$^{th}$ first latch 108 in the (m−1)$^{th}$ horizontal period. And, in the m$^{th}$ horizontal period, the pixel data rearranged at the data register 148 are shifted by two channels so that blank data are inputted to the first latch 108 and the second latch 108, the pixel data are latched in the order of 1, 3, 2, 4, 5, 7, 6, 8, 9, 11 shifted by two channels to the third latch 108 to the twelfth latch 108. Herein, the tenth and the twelfth pixel data are latched at two latches (not shown).

The second latch array 110 simultaneously latches the pixel data R, G, and B from the first latch array 106 in response to a source output enable signal SOE from the timing controller, and then output the latched pixel data. The second latch array 110 includes 2n (herein, for example, n=6) second latches 112 similar to the first latch array 106. The source output enable signal SOE is generated for each horizontal period, as shown in FIGS. 10A and 10B.

The first multiplexor array 114 performs an n time-division of 2n (herein, for example, n=2) pixel data from the second latch array 110 for each H/2 period to output the time-divided pixel data in response to selection control signals θ1 and θ2 from the timing controller.

To this end, the first multiplexor array 114 consists of n first multiplexors 116. Also, the first multiplexor array 114 has one more first multiplexor (not shown) considering that the pixel data is shifted by two channels. Each of the first multiplexors 116 selects and output any one output of the two second latches 112 in the second latch array 110. In other words, each of the first multiplexors 112 performs a time-division of the outputs of the two second latches 112 for each ½ period to apply the time-divided output.

More specifically, for a dot inversion driving, the odd-numbered first multiplexor 116 selects any one of the output signals of the two odd-numbered second latches 112 in response to the selection control signal θ1 and outputs the selected signal to the PDAC 124 of the DAC array 122 while the even-numbered first multiplexor 116 selects any one of the output signals of the two even-numbered second latches 112 in response to the selection control signal θ1 and outputs the selected signal to the NDAC 126 of the DAC array 122.

For example, the first first multiplexor 116 selects a first pixel data from the first second latch 112 at the first half of the (m−1)$^{th}$ horizontal period, and a third pixel data from the third second latch 112 at the second half, in response to the selection control signal 91 to output to PCAC1 124. The second first multiplexor 116 selects to output a second pixel data from the third second latch 112 at the first half, and a fourth pixel data from the fourth second latch 112 at the second half, in response to the selection control signal θ1 to output to the NDAC1 126.

And, the second first multiplexor 116 responds to the selection control signal θ1 to select a first pixel data from the third second latch 112 in the first half of the m$^{th}$ horizontal period, the third pixel data from the fourth second latch 112 in the second half so as to output the selected pixel data to the NDAC1 126. The fourth first multiplexor 116 responds to the selection control signal θ1 to select a second pixel data from the fifth second latch 112 in the first half, the fourth pixel data from the sixth second latch 112 in the second half so as to output the selected pixel data to the NDAC1 126. Herein, the selection control signal θ1, as illustrated in FIGS. 10A and 10B, has a polarity inverted for each ½ horizontal period.

The DAC array 122 converts the pixel data from the first multiplexor array 114 into pixel voltage signals with the aid of positive and negative gamma voltages GH and GL from the gamma voltage part 150 to output the pixel voltage signals. To this end, the DAC array 122 includes (n+1) PDAC's 124 and (n+1) NDAC's 126, which are alternately arranged in parallel to each other for a dot inversion driving. The PDAC 124 converts the pixel data from the first multiplexor array 114 into positive pixel voltage signals using the positive gamma voltages GH. On the other hand, the NDAC 126 converts the pixel data R, G, and B from the first multiplexor array 114 into negative pixel voltage signals using the negative gamma voltages GL. Such PDAC 124 and NDAC 126 carry out an operation of converting the digital pixel data inputted for each ½ horizontal period into analog pixel voltage signals.

For instance, the PDAC1 124 converts odd pixel data [1,1] and [1,3] inputted with being time-divided in the first horizontal period into pixel voltage signals, as shown in FIGS. 10A and 10B, to output the converted pixel data. At the same time, the NDAC2 126 also converts even pixel data [1,2] and [1,4] inputted with being time-divided in the first horizontal period into pixel voltage signals, as shown in FIGS. 10A and 10B, to output the converted pixel data. Then, in a second horizontal period, the NDAC1 126 converts odd pixel data [2,1] and [2,3] inputted time-divisionally into pixel voltage signals to output the converted pixel data. At the same time, the PDAC2 124 converts even pixel data [2,2] and [2,4] inputted with being time-divided in the second horizontal period into pixel voltage signals to output the converted pixel data. By such a DAC array 122, 2n pixel data are time-divided n by n for each ½ horizontal period to be converted into pixel voltage signals and then outputted.

Each of (n+1) buffers 130 included in the buffer array 128 buffers and outputs a pixel voltage signal from each of the PDAC's 124 and the NDAC's 126 of the DAC array 122.

The second multiplexor array 140 determines a path of each pixel voltage signal from the buffer array 128 in response to the polarity control signal POL from the timing controller. To this end, the second multiplexor array 140 includes n (herein, for example, n=6) multiplexors 142. Each of the multiplexors 142 selects and outputs any one output of the two adjacent buffers 130 in response to the polarity control signal POL. Herein, the outputs of the remaining buffers 130 excluding the first and last buffers 130 are commonly inputted to the two adjacent multiplexors 142. The multiplexor array 142 having the configuration as mentioned above allows the pixel voltage signals from the buffers 130 excluding the last buffer 130 to be outputted as they are at a corresponding one to one relationship in response to the polarity control signal POL.

Further, the second multiplexor array 142 allows the pixel voltage signals from the remaining buffers 130 excluding the first buffer 130 to be outputted to the demultiplexors 146 at a corresponding one to one relationship in response to the polarity control signal POL.

The polarity control signal POL, for a dot inversion driving, has a polarity inverted for each horizontal period, as shown in FIGS. 10A and 10B. As mentioned above, the second multiplexor array 140 determines polarities of the pixel voltage signals in response to the polarity control signal POL. As a result, the pixel voltage signal outputted from the second multiplexor array 140 has a polarity opposite to the adjacent pixel voltage signals and has its polarity inverted for each horizontal period.

The demultiplexor array 144 selectively applies the pixel voltage signals from the second multiplexor array 140 to 2n (herein, for example, n=6) data lines in response to selection control signal θ1 from the timing controller. To this end, the demultiplexor array 144 consists of n demultiplexors 146, each of which performs a time-division of the pixel voltage signal from each second multiplexor 142 and applies to two data lines.

For example, the first demultiplexor 146 selectively applies an output of the first multiplexor 142 to the first and third data lines DL1 and DL3 for each ½ horizontal period in response to the selection control signal θ1, as shown in FIGS. 10A and 10B. The second demultiplexor 146 selectively applies the output of the second multiplexor 142 to the second and fourth data lines DL2 and DL4 for each ½ horizontal period in response to the selection control signal θ1, as shown in FIGS. 10A and 10B.

Particularly, the first DEMUX 146 responds to the selection control signal θ1 to supply the pixel voltage signal [1,1] to the first data line D1 at the first half of the first horizontal period when the first gate line GL1 is activated, and to supply the pixel voltage signal [1,3] to the third data line D3 at the second half. At the same time, the second DEMUX 146 responds to the selection control signal θ1 to supply the pixel voltage signal [1,2] to the second data line D2 at the first half of the first horizontal period, and to supply the pixel voltage signal [1,4] to the fourth data line D4 at the second half. And, the first DEMUX 146 supplies each of pixel voltage signals [2,1] and [3,1] to the first data line DL1 at each first half of the second horizontal period H2 and the third horizontal period H3 and supplies each of pixel voltage signals [2,3] and [3,3] to the third data line DL3 at each second half. Simultaneously, the second DEMUX 146 supplies each of pixel voltage signals [2,2] and [3,2] to the second data line DL2 at each first half of the second horizontal period H2 and the third horizontal period H3 and supplies each of pixel voltage signals [2,4] and [3,4] to the fourth data line DL4 at each second half.

By the data-driving IC having the configuration as mentioned above, polarities of pixel voltage signals outputted to the odd data lines, such as DL1 and DL3, etc., are opposite to those of pixel voltage signals outputted to the even data lines, such as DL2 and DL4, etc., as shown in FIGS. 10A and 10B. Further, polarities of the odd data lines DL1, DL3, . . . and the even data lines DL2, DL4, . . . are inverted and for each frame for each horizontal period at which the gate lines GL1, GL2, GL3, . . . are sequentially driven.

Figure 11:
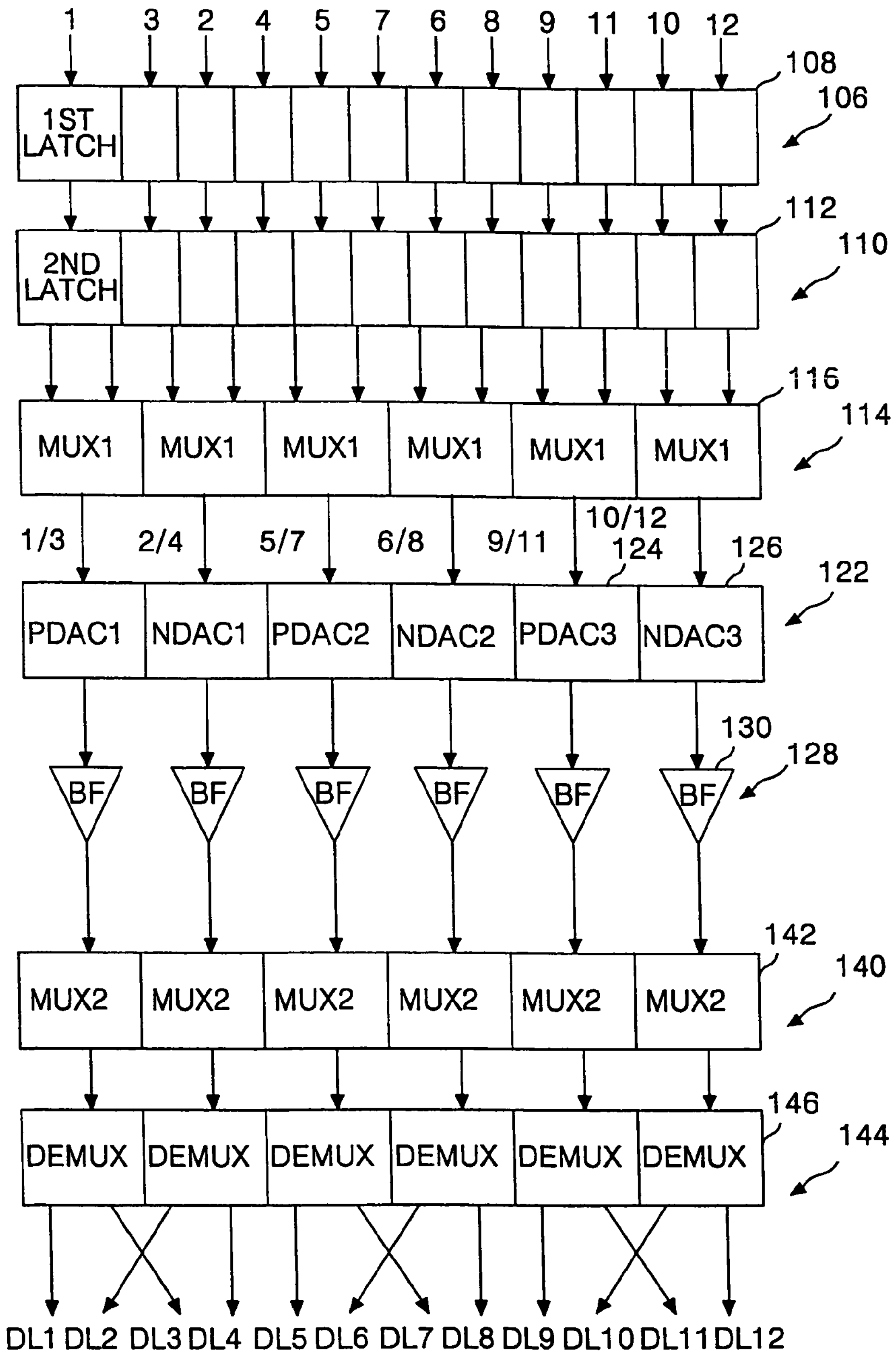
FIG. 11 is a flow diagram of data in the data-driving IC of FIG. 8, when a polarity control signal POL is in a low state.
Figure 12:
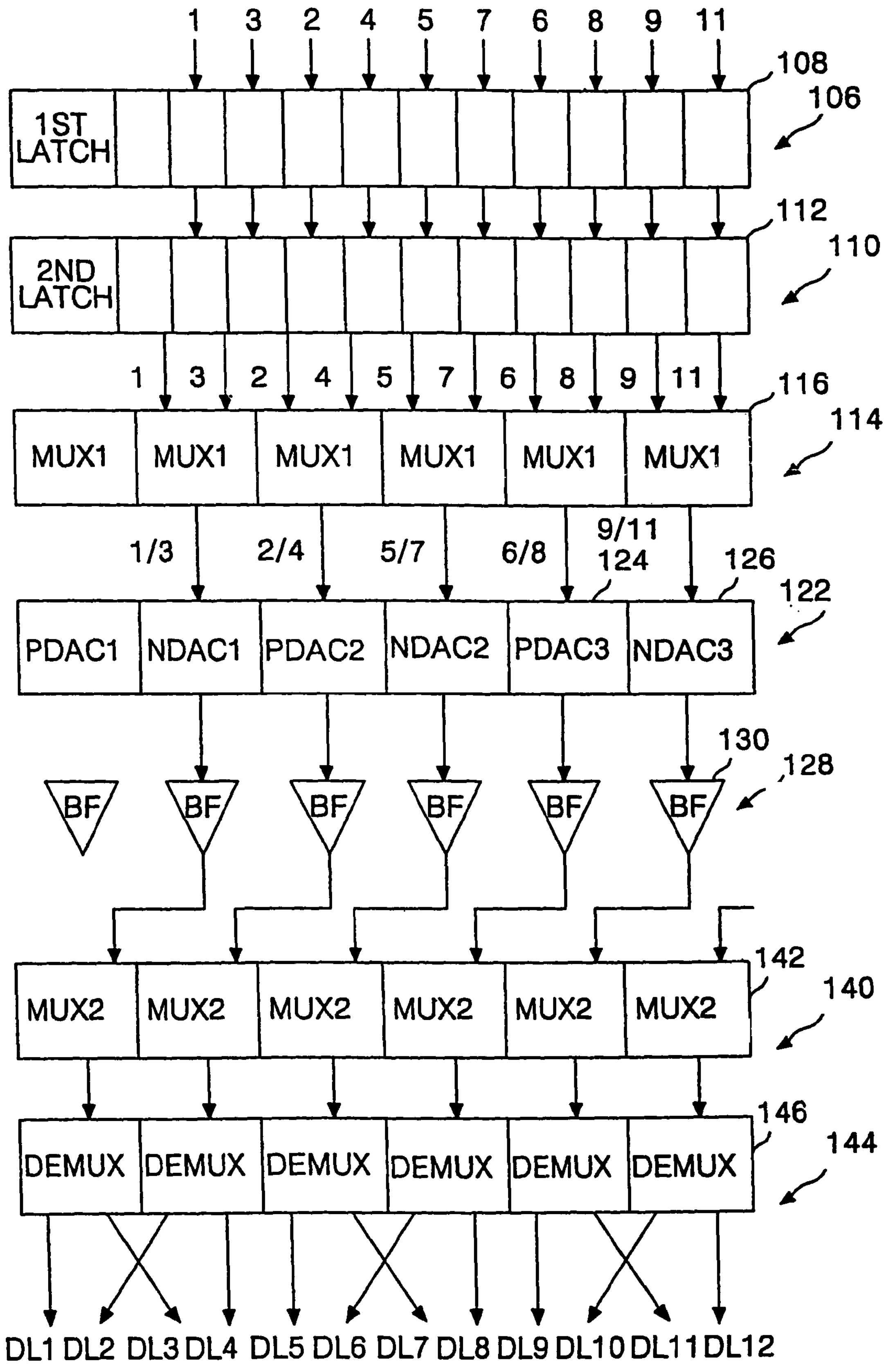
FIG. 12 is a flow diagram of data in the data-driving IC of FIG. 8, when a polarity control signal POL is in a high state.

FIGS. 11 and 12 illustrate a path of a pixel data according to the polarity control signal POL within the data-driving IC shown in FIG. 8.

The pixel data in the order of 1, 3, 2, 4, 5, 7, 6, 8, 9, 11, 10, 12 are latched at the first and second latch arrays 106 and 110 for the $(m-1)^{th}$ horizontal period. In the event of the polarity control signal POL being at the low state (or high state), that is, for the $(m-1)^{th}$ horizontal period, the first MUX array 114, as shown in FIG. 11, selects the pixel data of 1, 2, 5, 6, 9, 10 among the pixel data outputted from the second latch array 110 in the first half and the pixel data of 3, 4, 7, 8, 11, 12 in the second half, and supplies the selected pixel data to PDAC1 124 to NDAC3 126, respectively, to convert the selected pixel data to the pixel voltage signal. The second MUX array 142 have the pixel voltage signal, which is supplied through the buffer array 128 from PDAC1 124 to NDAC3 126, respectively, corresponded and supplied to the DEMUX's 146 one by one. Each of the DEMUX's 146 selectively supplies the inputted pixel voltage signal from each of the second MUX's 142 to 12 data lines DL1 to DL12.

The pixel data in the order of 1, 3, 2, 4, 5, 7, 6, 8, 9, 11, 10, 12 are shifted by two channels and latched at the first and second latch arrays 106 and 110 for the $m^{th}$ horizontal period. In this case, a blank data (not shown), which is an invalid pixel data, is supplied to a pair of the first latches 108 and a pair of the second latches 112 located at the previous stage. In the event of the polarity control signal POL being at the high state (or the low state), that is, for the $m^{th}$ horizontal period, the remaining MUX's 116 excluding the first MUX 116, as shown in FIG. 12, selects the pixel data of 1, 2, 5, 6, 9, 10 among the pixel data outputted from the second latch array 110 in the first half and the pixel data of 3, 4, 7, 8, 11, 12 in the second half, and respectively supplies to NDAC1 126 to PDAC4 124 to convert the selected pixel data to the pixel voltage signal. The second MUX array 142 have the pixel voltage signal, which is supplied through the buffer array 128 from NDAC1 126 to PDAC4 124, respectively, shifted by one channel to the left to be corresponded and supplied to the DEMUX's 146 one by one. Each of the DEMUX's 146 selectively supplies the inputted pixel voltage signal from each of the second MUX's 142 to 12 data lines DL1 to DL12.

As described above, the data-driving IC according to the present invention performs a time-divisional driving of the DAC array, thereby driving 2n channel data lines using (n+1) DAC's. In other words, each data-driving IC including (n+1) DAC's drives 2n data lines, so that it reduces the number of DAC's to ½.

Figure 13:
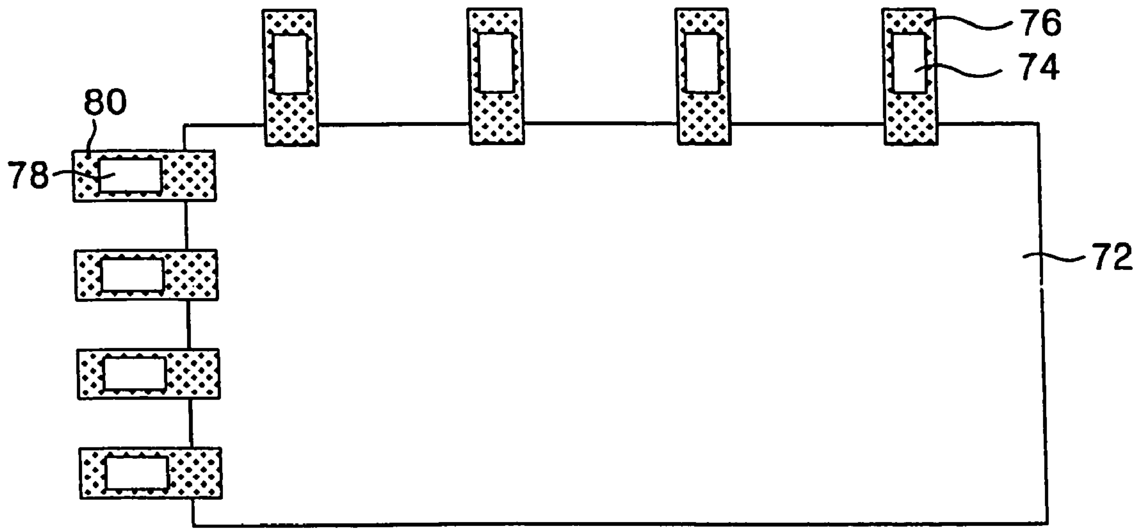
FIG. 13 is a schematic view showing a configuration of a liquid crystal display employing the data-driving IC of FIGS. 4 and 8.

FIG. 13 schematically illustrates a configuration of a liquid crystal display employing the data-driving IC of FIGS. 4 and 8. Referring to FIG. 13, the liquid crystal display includes data-driving IC's 74 connected through data TCP's 76 to a liquid crystal display panel 72, and gate driving IC's 78 connected through gate TCP's 80 to the liquid crystal display panel 72. Each of the data-driving IC's 74 is mounted on each data TCP 76, and is electrically connected through the data TCP 76 to each data pad provided at the upper portion of the liquid crystal display panel 72. Each of the gate driving IC's 78 is mounted on each gate TCP 80, and is electrically connected through the gate TCP 10 to each gate pad provided at one side of the liquid crystal display panel 72.

The gate driving IC's 78 drive the gate lines of the liquid crystal display panel 72 sequentially one line by one line for each horizontal period. The data-driving IC's 74 convert digital pixel data signals into analog pixel voltage signals to apply the converted signals on a time-division basis to the data lines of the liquid crystal display panel 72 for each ½ horizontal period (H/2). Accordingly, in order to drive 8n data lines, the conventional LCD requires 8 data-driving IC's, each of which drives n data lines, whereas the LCD according to the present invention requires only 4 data-driving IC's for performing a time-divisional driving of 2n data lines.

Meanwhile, when the data lines are driven on a time-division basis, there occurs a difference between a charge amount of the pixel voltage supplied in the first half of horizontal period and that of pixel voltage supplied in the second half thereof. This is because a charge time becomes different due to a charge time difference between the pixel voltages supplied in the first half and those in the second half. In other words, the pixel voltage supplied in the first half is charged in the corresponding liquid crystal cells for an approximately one horizontal period, whereas the,pixel voltage supplied in the second half is charged in the corresponding liquid crystal cells for an approximately ½ horizontal period H/2. Since a charge amount of the pixel voltage becomes different between the liquid crystal cells due to such a charge time difference, a flicker phenomenon may occur.

In order to overcome this problem, a charge sequence of the pixel voltage is changed into the specific factor, such as line, field or frame, etc., to compensate for a difference in the pixel voltage charge amount. For example, when a pixel voltage is applied to the specific cell in the first half of one horizontal period at the current frame to charge the pixel voltage over one horizontal period, the pixel voltage is applied in the second half thereof at the next frame to charge over ½ horizontal period H/2. Such a change in a charge sequence of the pixel voltage for each frame may compensate for a pixel voltage charge amount difference caused by a charge time difference. Further, a change in a charge sequence of the pixel voltage for each line or for each several lines may also compensate for a pixel voltage charge amount difference. Otherwise, if a charge sequence of the pixel voltage is changed for each line and frame or for each several lines and frames, then a pixel voltage charge amount difference is compensated.

Figure 14A:
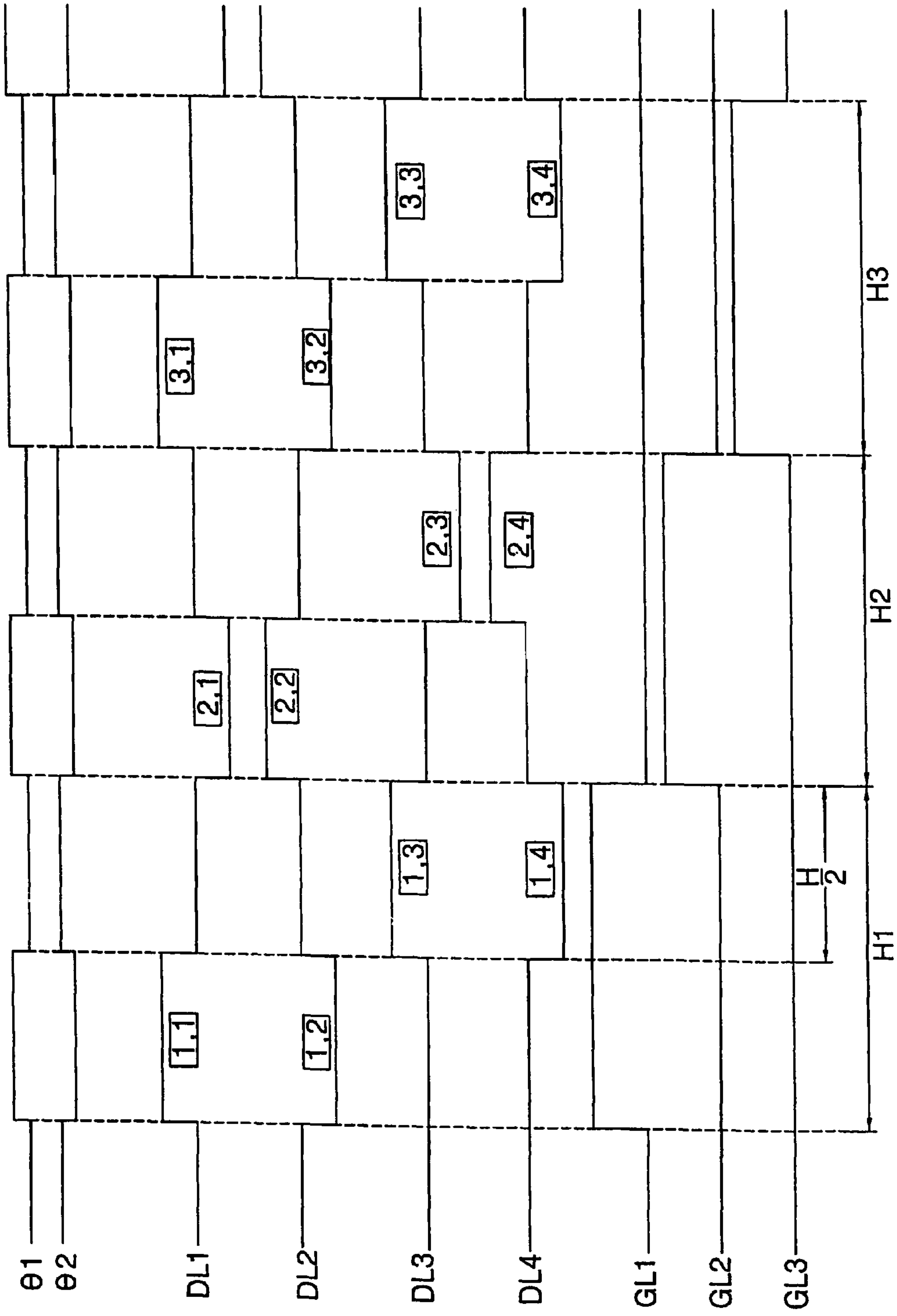
FIGS. 14A and 14B are waveform diagrams of signals for driving the data lines by changing a charging sequence for each frame when the data lines driven in a dot inversion scheme are time-divided.
Figure 14B:
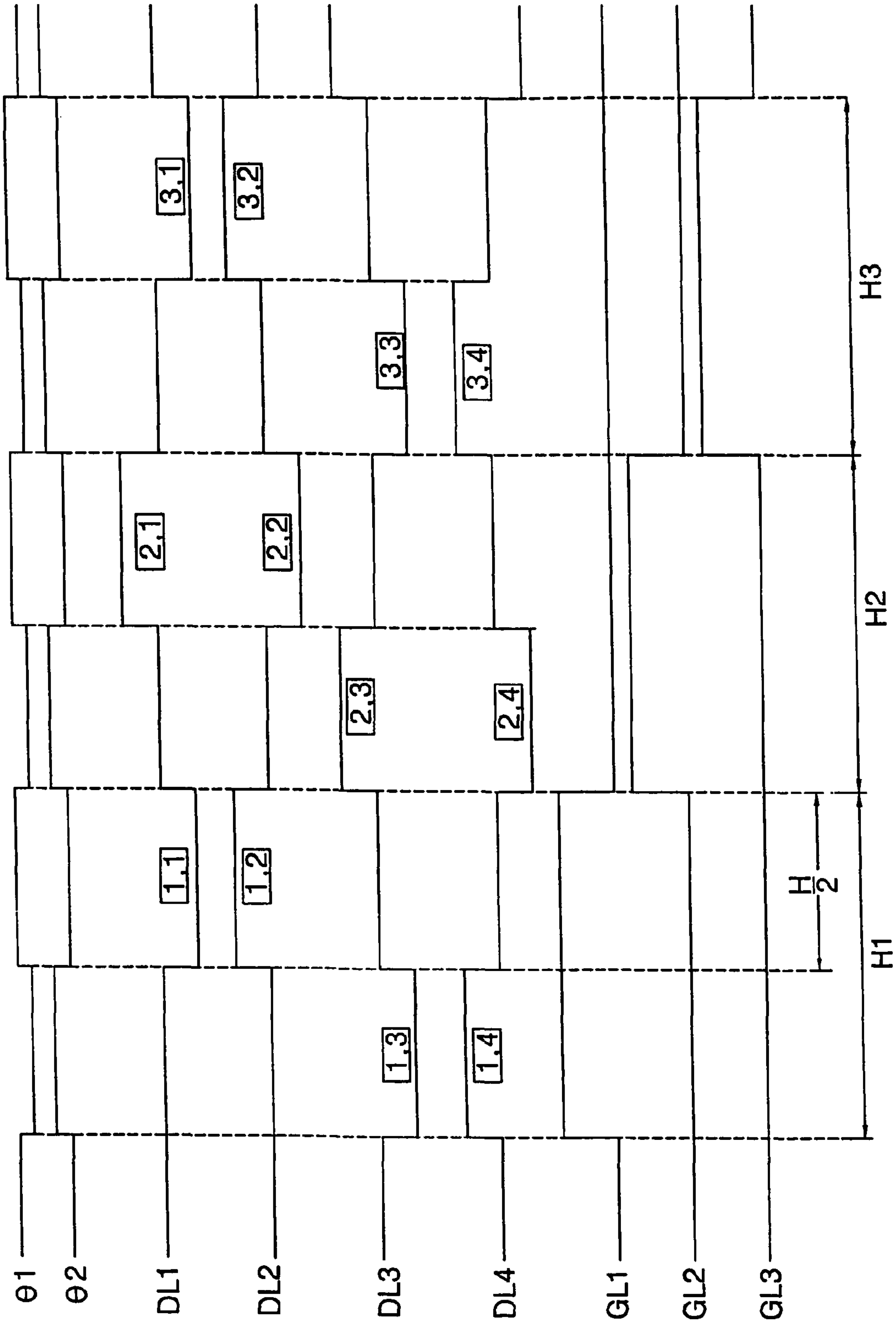

FIGS. 14A and 14B illustrate a driving waveform for driving the data lines on a time-division basis with changing a charge sequence of the pixel voltage for each frame. Particularly, FIG. 14A illustrates a signal waveform for driving the first to fourth data lines DL1 to DL4 for an odd frame by means of the data-driving apparatus shown in FIGS. 4 and 8, while FIG. 14B illustrates a signal waveform for an even frame.

In FIG. 14A related to an odd frame, pixel data [1,1] [1,2] are selected by the selection control signals θ1 and θ2, respectively, for a H/2 period, which is the first half of the first horizontal period H1. The pixel data [1,1] is converted into a positive pixel voltage signal with the aid of a polarity control signal (not shown) to be applied to the first data line DL1. The pixel data [1,2] is converted into a negative pixel voltage signal with the aid of a polarity control signal (not shown) to be applied to the second data line DL2. Subsequently, for a H/2 period, which is the second half thereof, pixel data [1,3] and [1,4] are selected by the selection control signals θ1 and θ2, respectively. The pixel data [1,3] is converted into a positive pixel voltage signal with the aid of a polarity control signal (not shown) to be applied to the third data line DL3. The pixel data [1,4] is converted into a negative pixel voltage signal with the aid of a polarity control signal (not shown) to be applied to the fourth data line DL4.

Similarly, pixel data [2,1] and [2,2] are selected by the selection control signals θ1 and θ2, respectively, for a H/2 period, which is the first half of the second horizontal period H2. The pixel data [2,1] is converted into a negative pixel voltage signal with the aid of a polarity control signal (not shown) to be applied to the first data line DL1. The pixel data [2,2] is converted into a positive pixel voltage signal with the aid of a polarity control signal (not shown) to be applied to the second data line DL2. Subsequently, for a H/2 period, which is the second half thereof, pixel data [2,3] and [2,4] are selected by the selection control signals θ1 and θ2, respectively. The pixel data [2,3] is converted into a negative pixel voltage signal with the aid of a polarity control signal (not shown) to be applied to the third data line DL3. The pixel data [2,4] is converted into a positive pixel voltage signal with the aid of a polarity control signal (not shown) to be applied to the fourth data line DL4.

As described above, at the odd frame, the data-driving apparatus according to the present invention drives the data lines on a time-division basis and in a dot inversion scheme.

In FIG. 13B related to an even frame, pixel data [1,3] and [1,4] are selected by the selection control signals θ1 and θ2, respectively, for a H/2 period, which is the first half of the first horizontal period H1. The pixel data [1,3] is converted into a negative pixel voltage signal with the aid of a polarity control signal (not shown) to be applied to the third data line DL3. The pixel data [1,4] is converted into a positive pixel voltage signal with the aid of a polarity control signal (not shown) to be applied to the fourth data line DL4. Subsequently, for a H/2 period which is the second half thereof, pixel data [1,1] and [1,2] are selected by the selection control signals θ1 and θ2, respectively. The pixel data [1,1] is converted into a negative pixel voltage signal with the aid of a polarity control signal (not shown) to be applied to the first data line DL1. The pixel data [1,2] is converted into a positive pixel voltage signal with the aid of a polarity control signal (not shown) to be applied to the second data line DL2.

Similarly, pixel data [2,3] and [2,4] are selected by the selection control signals θ1 and θ2, respectively, for a H/2 period, which is the first half of the second horizontal period H2. The pixel data [2,3] is converted into a positive pixel voltage signal with the aid of a polarity control signal (not shown) to be applied to the third data line DL3. The pixel data [2,4] is converted into a negative pixel voltage signal with the aid of a polarity control signal (not shown) to be applied to the fourth data line DL4. Subsequently, for a H/2 period, which is the second half thereof, pixel data [2,1] and [2,2] are selected by the selection control signals θ1 and θ2, respectively. The pixel data [2,1] is converted into a positive pixel voltage signal with the aid of a polarity control signal (not shown) to be applied to the first data line DL1. The pixel data [2,2] is converted into a negative pixel voltage signal with the aid of a polarity control signal (not shown) to be applied to the second data line DL2.

As described above, at the even frame, the data-driving apparatus according to the present invention drives the data lines on a time-division basis and in a dot inversion scheme.

Furthermore, at the even frame, the present data-driving apparatus drives the data lines with changing a charge sequence of the pixel voltage with respect to the odd frame. Accordingly, due to a charge time difference according to a time-divisional driving, a pixel voltage charge amount difference generated at the odd frame is compensated at the even frame. As a result, it prevents a flicker phenomenon caused by the pixel voltage charge amount difference upon time-divisional driving of the data lines.

Figure 15A:
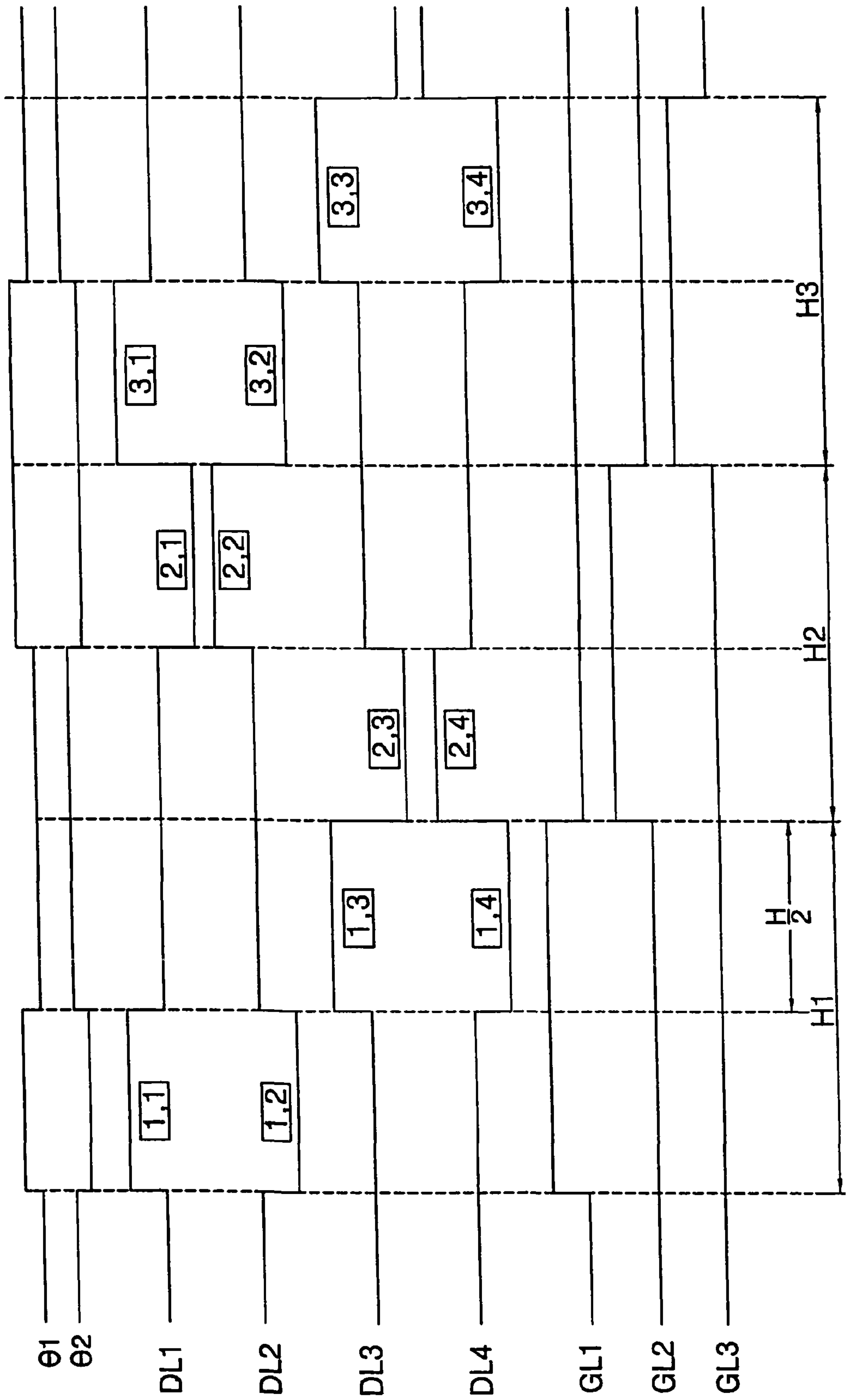
FIGS. 15A and 15B are waveform diagrams of signals for driving the data lines by changing a charging sequence for each line and for each frame when the data lines driven in a dot inversion scheme are time-divided.
Figure 15B:
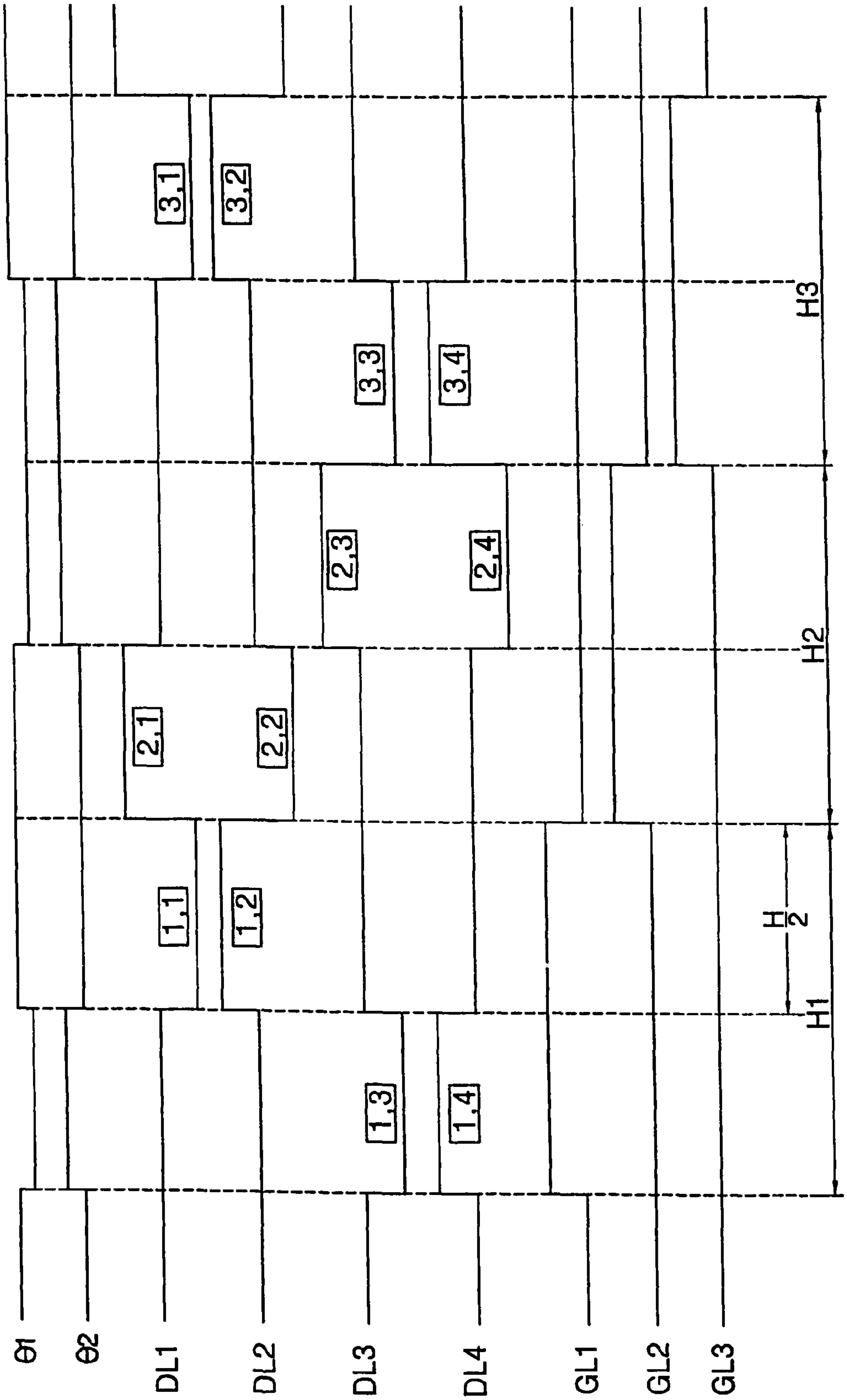

FIGS. 15A and 15B illustrate a driving waveform for driving the data lines on a time-division basis with changing a charge sequence of the pixel voltage for each line and frame. Particularly, FIG. 15A illustrates a signal waveform for driving the first to fourth data lines DL1 to DL4 at an odd frame by means of the data-driving apparatus of FIGS. 4 and 8, while FIG. 15B illustrates a signal waveform at an even frame.

In FIG. 15A related to an odd frame, pixel data [1,1] and pixel data [1,2] are selected by the selection control signals θ1 and θ2, respectively, for a H/2 period, which is the first half of the first horizontal period H1. The pixel data [1,1] is converted into a positive pixel voltage signal with the aid of a polarity control signal (not shown) to be applied to the first data line DL1. The pixel data [1,2] is converted into a negative pixel voltage signal with the aid of a polarity control signal (not shown) to be applied to the second data line DL2. Subsequently, for a H/2 period, which is the second half thereof, pixel data [1,3] and [1,4] are selected by the selection control signals θ1 and θ2, respectively. The pixel data [1,3] is converted into a positive pixel voltage signal with the aid of a polarity control signal (not shown) to be applied to the third data line DL3. The pixel data [1,4] is converted into a negative pixel voltage signal with the aid of a polarity control signal (not shown) to be applied to the fourth data line DL4.

For a H/2 period, which is the first half of the second horizontal period H2, pixel data [2,3] and [2,4] are selected by the selection control signals θ1 and θ2, respectively, unlike the first horizontal period H1. The pixel data [2,3] is converted into a negative pixel voltage signal with the aid of a polarity control signal (not shown) to be applied to the third data line DL1. The pixel data [2,4] is converted into a positive pixel voltage signal with the aid of a polarity control signal (not shown) to be applied to the fourth data line DL4. Subsequently, for a H/2 period, which is the second half thereof, pixel data [2,1] and [2,2] are selected by the selection control signals θ1 and θ2, respectively. The pixel data [2,1] is converted into a negative pixel voltage signal with the aid of a polarity control signal (not shown) to be applied to the first data line DL1. The pixel data [2,2] is converted into a positive pixel voltage signal with the aid of a polarity control signal (not shown) to be applied to the second data line DL2.

As described above, at the odd frame, the data-driving apparatus according to the present invention drives the data lines on a time-division basis and in a dot inversion scheme. Further, the present data-driving apparatus drives the data lines with changing a charge sequence of the pixel voltage for each line.

In FIG. 15B related to an even frame, pixel data [1,3] and [1,4] are selected by the selection control signals θ1 and θ2, respectively, for a H/2 period, which is the first half of the first horizontal period H1. The pixel data [1,3] is converted into a negative pixel voltage signal with the aid of a polarity control signal (not shown) to be applied to the third data line DL3. The pixel data [1,4] is converted into a positive pixel voltage signal with the aid of a polarity control signal (not shown) to be applied to the fourth data line DL4. Subsequently, for a H/2 period, which is the second half thereof, pixel data [1,1] and [1,2] are selected by the selection control signals θ1 and θ2, respectively. The pixel data [1,1] is converted into a negative pixel voltage signal with the aid of a polarity control signal (not shown) to be applied to the first data line DL1. The pixel data [1,2] is converted into a positive pixel voltage signal with the aid of a polarity control signal (not shown) to be applied to the second data line DL2.

For a H/2 period, which is the first half of the second horizontal period H2, pixel data [2,l] and [2,2] are selected by the selection control signals θ1 and θ2, respectively, unlike the first horizontal period H1. The pixel data [2,1] is converted into a positive pixel voltage signal with the aid of a polarity control signal (not shown) to be applied to the first data line DL1. The pixel data [2,2] is converted into a negative pixel voltage signal with the aid of a polarity control signal (not shown) to be applied to the second data line DL2. Subsequently, for a H/2 period, which is the second half thereof, pixel data [2,3] and [2,4] are selected by the selection control signals θ1 and θ2, respectively. The pixel data [2,3] is converted into a positive pixel voltage signal with the aid of a polarity control signal (not shown) to be applied to the third data line DL3. The pixel data [2,4] is converted into a negative pixel voltage signal with the aid of a polarity control signal (not shown) to be applied to the fourth data line DL4.

As described above, at the even frame, the data-driving apparatus according to the present invention drives the data lines on a time-division basis and in a dot inversion scheme.

Furthermore, the present data-driving apparatus drives the data lines with changing a charge sequence of the pixel voltage for each line, and drives the data lines at the even frame with changing a charge sequence of the pixel voltage with respect to the odd frame. Accordingly, a pixel voltage charge amount difference caused by a charge time difference according to a time-divisional driving is compensated. Alternatively, even when a charge sequence of the pixel voltage is changed for each several lines (e.g., for each two lines) and for each frame, a pixel voltage charge amount difference is compensated. As a result, it prevents a flicker phenomenon caused by the pixel voltage charge amount difference upon time-divisional driving of the data lines.

Figure 16A:
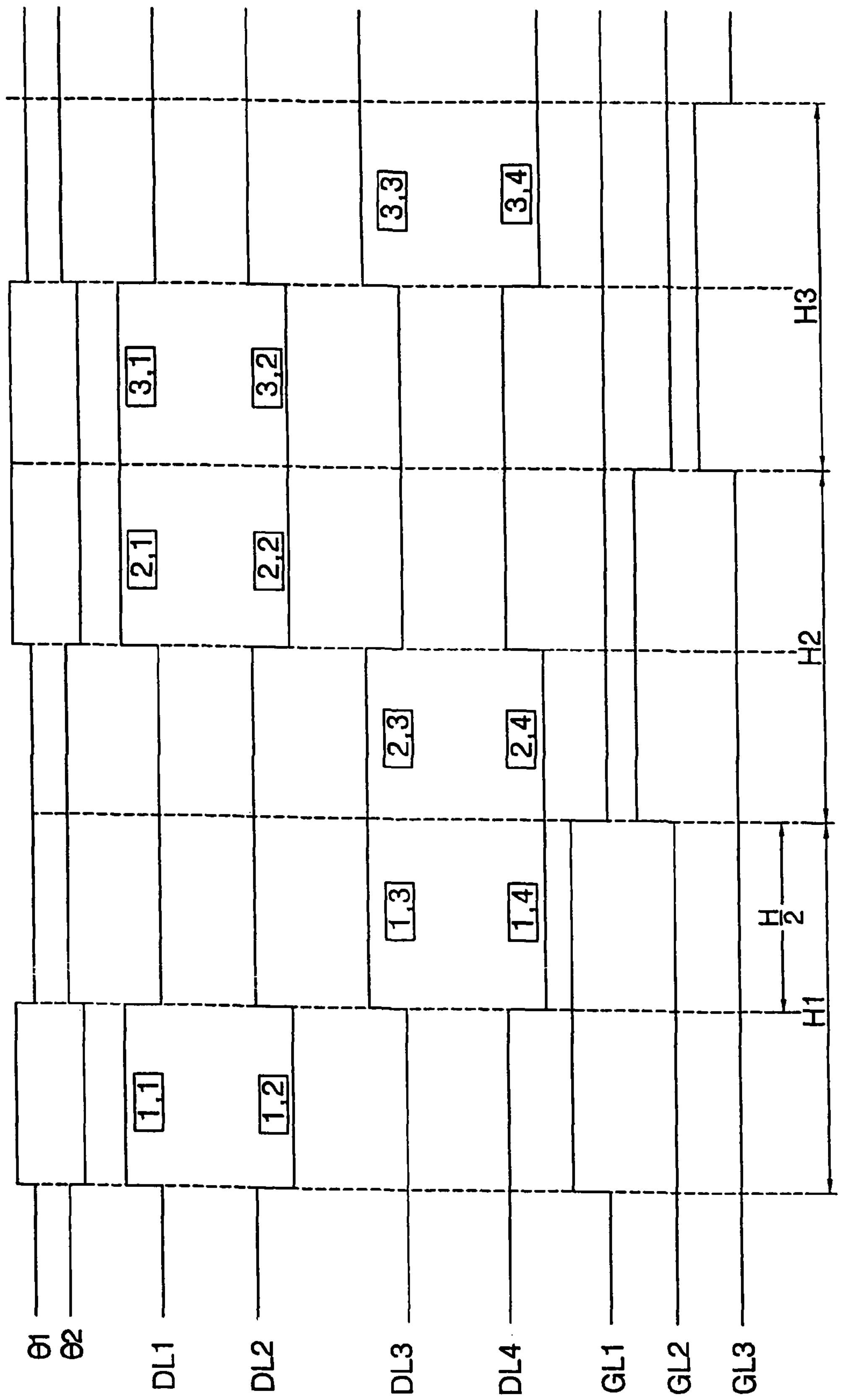
FIGS. 16A and 16B are waveform diagrams of signals for driving the data lines by changing a charging sequence for each line and for each frame when the data lines driven in a column inversion scheme are time-divided.
Figure 16B:
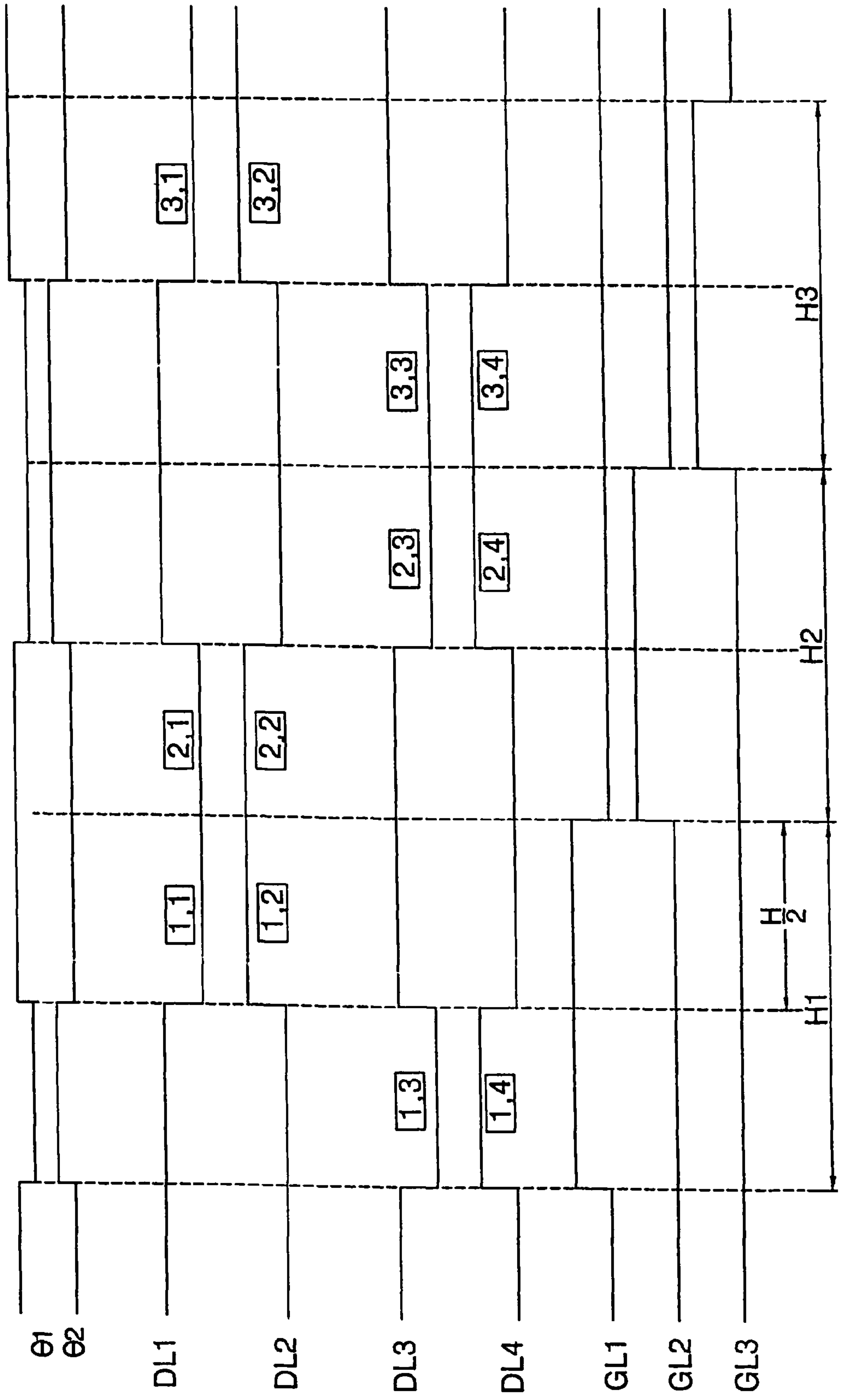

FIGS. 16A and 16B illustrate a driving waveform for driving the data lines driven in a column inversion scheme on a time-division basis with changing a charge sequence of the pixel voltage for each line and frame. Particularly, FIG. 16A illustrates a signal waveform for driving the first to fourth data lines DL1 to DL4 at an odd frame by means of the data-driving apparatus of FIGS. 4 and 8, while FIG. 16B illustrates a signal waveform at an even frame.

In FIG. 16A related to an odd frame, pixel data [1,1] and [1,2] are selected by the selection control signals θ1 and θ2, respectively, for a H/2 period, which is the first half of the first horizontal period H1. The pixel data [1,1] is converted into a positive pixel voltage signal with the aid of a polarity control signal (not shown) to be applied to the first data line DL1. The pixel data [1,2] is converted into a negative pixel voltage signal with the aid of a polarity control signal (not shown) to be applied to the second data line DL2. Subsequently, for a H/2 period, which is the second half thereof, pixel data [1,3] and pixel data [1,4] are selected by the selection control signals θ1 and θ2, respectively. The pixel data [1,3] is converted into a positive pixel voltage signal with the aid of a polarity control signal (not shown) to be applied to the third data line DL3. The pixel data [1,4] is converted into a negative pixel voltage signal with the aid of a polarity control signal (not shown) to be applied to the fourth data line DL4.

For a H/2 period, which is the first half of the second horizontal period H2, pixel data [2,3] and [2,4] are selected by the selection control signals θ1 and θ2, respectively, unlike the first horizontal period H1. The pixel data [2,3] is converted into a positive pixel voltage signal with the aid of a polarity control signal (not shown) to be applied to the third data line DL1. The pixel data [2,4] is converted into a negative pixel voltage signal with the aid of a polarity control signal (not shown) to be applied to the fourth data line DL4. Subsequently, for a H/2 period, which is the second half thereof, pixel data [2,1] and pixel data [2,2] are selected by the selection control signals θ1 and θ2, respectively. The pixel data [2,l] is converted into a positive pixel voltage signal with the aid of a polarity control signal (not shown) to be applied to the first data line DL1. The pixel data [2,2] is converted into a negative pixel voltage signal with the aid of a polarity control signal (not shown) to be applied to the second data line DL2.

As described above, at the odd frame, the data-driving apparatus according to the present invention drives the data lines on a time-division basis and in a column inversion scheme. Further, the present data-driving apparatus drives the data lines with changing a charge sequence of the pixel voltage for each line.

In FIG. 16B related to an even frame, pixel data [1,3] and [1,4] are selected by the selection control signals θ1 and θ2, respectively, for a H/2 period, which is the first half of the first horizontal period H1. The pixel data [1,3] is converted into a negative pixel voltage signal with the aid of a polarity control signal (not shown) to be applied to the third data line DL3. The pixel data [1,4] is converted into a positive pixel voltage signal with the aid of a polarity control signal (not shown) to be applied to the fourth data line DL4. Subsequently, for a H/2 period, which is the second half thereof, pixel data [1,1] and [1,2] are selected by the selection control signals θ1 and θ2, respectively. The pixel data [1,1] is converted into a negative pixel voltage signal with the aid of a polarity control signal (not shown) to be applied to the first data line DL1. The pixel data [1,2] is converted into a positive pixel voltage signal with the aid of a polarity control signal (not shown) to be applied to the second data line DL2.

For a H/2 period, which is the first half of the second horizontal period H2, pixel data [2,1] and [2,2] are selected by the selection control signals θ1 and θ2, respectively, unlike the first horizontal period H1. The pixel data [2,1] is converted into a negative pixel voltage signal with the aid of a polarity control signal (not shown) to be applied to the first data line DL1. The pixel data [2,2] is converted into a positive pixel voltage signal with the aid of a polarity control signal (not shown) to be applied to the second data line DL2. Subsequently, for a H/2 period, which is the second half thereof, pixel data [2,3] and [2,4] are selected by the selection control signals θ1 and θ2, respectively. The pixel data [2,3] is converted into a negative pixel voltage signal with the aid of a polarity control signal (not shown) to be applied to the third data line DL3. The pixel data [2,4] is converted into a positive pixel voltage signal with the aid of a polarity control signal (not shown) to be applied to the fourth data line DL4.

As described above, at the even frame, the data-driving apparatus according to the present invention drives the data lines on a time-division basis and in a column inversion scheme.

Furthermore, the present data-driving apparatus drives the data lines with changing a charge sequence of the pixel voltage for each line, and drives the data lines at the even frame with changing a charge sequence of the pixel voltage with respect to the odd frame. Accordingly, a pixel voltage charge amount difference caused by a charge time difference according to a time-divisional driving is compensated. Alternatively, even when a charge sequence of the pixel voltage is changed for each several lines (e.g., for each two lines) and for each frame, a pixel voltage charge amount difference is compensated. As a result, it prevents a flicker phenomenon caused by the pixel voltage charge amount difference upon time-divisional driving of the data lines.

As described above, according to the present invention, the DAC part is driven on a time-division basis, thereby driving at least 2n data lines using (n+1) DAC's. Accordingly, the number of data-driving IC's is reduced to ½ in comparison to the related art to lower the manufacturing cost.

In addition, according to the present inventions a charge sequence of the pixel voltage is driven on a time-division basis with being changing for each line, for each several lines, for each frame, for each line and frame, or for each several lines and frames. Accordingly, a pixel voltage charge amount difference caused by a charge time difference according to a time-divisional driving is compensated, so that it becomes possible to prevent a flicker phenomenon, etc.

It will be apparent to those skilled in the art that various modifications and variations can be made in the apparatus and method for data-driving the liquid crystal display of the present invention without departing from the spirit or scope of the inventions. Thus, it is intended that the present invention covers the modifications and variations of this invention provided they come within the scope of the appended claims and their equivalents.

What is claimed is:

1. A data-driving apparatus for a liquid crystal display, comprising:

a first multiplexor array performing a time-division on input pixel data and supplying the time-divided data and alternately changing a supplying sequence of the time-divided pixel data for a predetermined period, wherein the input data include at least n time-divided pixel data (wherein n is an integer);

a digital-to-analog converter array including at least (n+1) positive and negative digital-to-analog converters converting the at least n time-divided pixel data into at least n time-divided pixel voltage signals, and the positive digital-to-analog converter and the negative digital-to-analog converter being alternately arranged;

a demultiplexor array performing time-division on data lines and supplying the at least n time-divided pixel voltage signals to the time-divided data lines and alternately changing a supplying sequence of the at least n time-divided pixel voltage signals for the predetermined period;

a second multiplexor array determining a path of the at least n time-divided pixel data in response to a polarity control signal to input the at least n time-divided pixel data to the at least n positive and negative digital-to-analog converters among the at least (n+1) positive and negative digital-to-analog converters; and a third multiplexor array determining a path of the at least n time-divided pixel voltage signals in response to the polarity control signal to input the at least n time-divided pixel voltage signals to the demultiplexor array, wherein the predetermined period includes at least one of at least one horizontal period and at least one frame.

2. The data-driving apparatus according to claim 1, wherein the first multiplexor array includes at least n first multiplexors, the second multiplexor array includes at least n−1 second multiplexors, the third multiplexor array includes at least n third multiplexors, and the demuxplexor array includes at least n demultiplexors.

3. A method of driving a data in a liquid crystal display, comprising:

performing time-division on input pixel data to supply the time-divided pixel data, wherein the input data include at least n time-divided pixel data (wherein n is an integer);

converting the at least n time-divided pixel data into at least n time-divided pixel voltage signals by a digital-to-analog converter array including at least (n+1) positive and negative digital-to-analog converters, wherein the positive digital-to-analog converter and the negative digital-to-analog converter are alternately arranged;

performing time-division on data lines to supply the at least n time-divided pixel voltage signals to at least n time-divided data lines;

determining a path of the at least n time-divided pixel data in response to a polarity control signal to input the at least n time-divided pixel data to the at least n positive and negative digital-to-analog converters among the at least (n+1) positive and negative digital-to-analog converters; and determining an output path of the at least n time-divided pixel voltage signals from the digital-to-analog converter array in response to the polarity control signal to output the at least n time-divided pixel voltage signals;

alternately changing a supplying sequence of the at least n time-divided pixel data for a predetermined period; and alternately changing a supplying sequence of the at least n time-divided pixel voltage signals for the predetermined period, wherein the predetermined period includes at least one of at least one horizontal period and at least one frame.

* * * * *